United States Patent
Yen

(10) Patent No.: US 12,131,535 B2
(45) Date of Patent: Oct. 29, 2024

(54) METHOD FOR RECOGNIZING OBJECT ASSEMBLIES IN AUGMENTED REALITY IMAGES

(71) Applicant: VISUAL FUN CO., LTD., Taipei (TW)

(72) Inventor: Wu-Hsiung Yen, Taipei (TW)

( * ) Notice: Subject to any disclaimer, the term of this patent is extended or adjusted under 35 U.S.C. 154(b) by 0 days.

(21) Appl. No.: 18/511,965

(22) Filed: Nov. 16, 2023

(65) Prior Publication Data

US 2024/0177479 A1    May 30, 2024

Related U.S. Application Data

(60) Provisional application No. 63/385,034, filed on Nov. 27, 2022.

(51) Int. Cl.
*G06V 20/20* (2022.01)
*G06F 3/01* (2006.01)
*G06T 19/00* (2011.01)
*G06V 20/64* (2022.01)

(52) U.S. Cl.
CPC .............. *G06V 20/20* (2022.01); *G06F 3/017* (2013.01); *G06T 19/006* (2013.01); *G06V 20/64* (2022.01)

(58) Field of Classification Search
CPC ........ G06V 20/20; G06V 20/64; G06F 3/017; G06T 19/006
See application file for complete search history.

(56) References Cited

U.S. PATENT DOCUMENTS

| | | | |
|---|---|---|---|
| 6,697,524 B1 * | 2/2004 | Arai | G06V 30/242 |
| | | | 382/187 |
| 7,133,556 B1 * | 11/2006 | Matsushita | G06V 10/987 |
| | | | 382/187 |
| 9,155,967 B2 | 10/2015 | Koganezawa et al. | |
| 10,068,547 B2 * | 9/2018 | Sobeski | G09G 5/026 |
| 10,166,473 B2 | 1/2019 | Wong | |
| 10,445,569 B1 * | 10/2019 | Lin | G06T 7/0004 |
| 10,532,271 B2 | 1/2020 | Oh | |
| 10,565,796 B2 | 2/2020 | Hagbi et al. | |

(Continued)

FOREIGN PATENT DOCUMENTS

| | | |
|---|---|---|
| CN | 109754644 A | 5/2019 |
| KR | 101227237 B1 | 9/2011 |

OTHER PUBLICATIONS

Office Action by TIPO, Jun. 7, 2023.
(Continued)

*Primary Examiner* — Grant Sitta
(74) *Attorney, Agent, or Firm* — OPES IP Consulting Co., Ltd.; Laurence Kao

(57) ABSTRACT

A method for recognizing at least one object in images by a camera and a processor is provided. The at least one object includes content information and operation direction information. The operation direction information includes inspection direction, re-inspection direction, and a combination thereof. The method includes a first re-inspection step, the first re-inspection step includes using the processor to inspect whether the re-inspection direction of one of the at least one object matches a paring relationship. If so, the processor processes the content information of the at least one object and another one object to generate computational result.

31 Claims, 18 Drawing Sheets

(56) References Cited

U.S. PATENT DOCUMENTS

| | | | | |
|---|---|---|---|---|
| 11,410,408 | B2* | 8/2022 | Kimura | G06V 30/224 |
| 11,537,812 | B2* | 12/2022 | Kimura | G06V 30/19113 |
| 2005/0166053 | A1* | 7/2005 | Cui | H04L 63/126 |
| | | | | 713/176 |
| 2008/0063279 | A1* | 3/2008 | Vincent | G06F 18/254 |
| | | | | 382/182 |
| 2012/0015341 | A1* | 1/2012 | Self | G09B 7/00 |
| | | | | 434/365 |
| 2012/0027305 | A1* | 2/2012 | Kim | G06V 20/10 |
| | | | | 382/181 |
| 2018/0214767 | A1* | 8/2018 | Oh | G06T 13/20 |
| 2018/0260652 | A1* | 9/2018 | Collet | G06V 30/158 |
| 2020/0334504 | A1* | 10/2020 | Cheng | G06F 18/253 |
| 2020/0410345 | A1* | 12/2020 | Morishita | G06N 3/0442 |
| 2022/0284579 | A1* | 9/2022 | Nye | G16H 40/63 |

OTHER PUBLICATIONS

Notice of Allowance by TIPO, Jul. 20, 2023.
Notice of Interview by TIPO, Jun. 28, 2023.
Interview Opinion by TIPO, Jul. 4, 2023.

\* cited by examiner (A)

(B)

(C)

(D)

METHOD FOR RECOGNIZING OBJECT ASSEMBLIES IN AUGMENTED REALITY IMAGES

CROSS-REFERENCE TO RELATED APPLICATIONS

The present application claims priority to U.S. Patent Application Ser. No. 63/385,034, filed on Nov. 27, 2022, which is hereby incorporated by reference in their entirety.

BACKGROUND OF THE INVENTION

This disclosure is relating to a method for achieving stable assemblies of two or more objects when conducting augmented reality interactions by recognizing objects in an image.

As augmented reality (AR) technology develops, more application scenarios are being developed and applied. Further, AR card games have become a new form of interaction. Typically, mobile devices with AR capabilities detect card patterns and then provide corresponding AR information. However, when the camera of mobile devices based on existing technologies simultaneously detects assemblies of two or more card patterns, there can be issues with detection stability.

SUMMARY OF THE INVENTION

This disclosure provides an embodiment of a method that using a camera and a processor to recognizes at least one object in an image, wherein the at least one object includes content information and operation direction information. The operation direction information comprises an inspection direction, a re-inspection direction, or a combination thereof. This method includes a first re-inspection step, which includes using the processor to inspect whether the inspection direction of an object of the at least one object and the re-inspection direction of any one object of the at least one object, which the object is adjacent to, conforms to a pairing relationship. If in conformity with the pairing relationship, the processor processes the content information of the at least one object and the content information of the any one object of the at least one object to generate a computational result.

This disclosure presents an embodiment of a method using a camera and processor to recognize objects in an image. Any of the plurality of objects includes a content information and a plurality of direction information, the plurality of direction information including a first direction and a second direction. The method comprises a step A, a step B, a step C, and a step D. The step A includes: (1) when an object of the plurality of objects, in the first direction of the object, is adjacent to other one object of the plurality of objects, and the object of the plurality of objects, in the second direction of the object, is not adjacent to the plurality of objects, using the processor to generate an information set corresponding to the object of the plurality of objects, and stores the content information of the object of the plurality of objects in the information set; and (2) determining the object of the plurality of objects as a reference object. The step B includes: (1) if the reference object, in the first direction of the reference object, is adjacent to any one object of the plurality of objects other than the reference object, using the processor to mark the any one object of the plurality of objects as a following object and executing the step C; and (2) if the reference object, in the first direction of the reference object, is not adjacent to the plurality of objects, executing Step D. The step C includes: (1) using the processor to determine if the following object, in the second direction of the following object, is adjacent to the reference object, using the processor to store the content information of the following object into the information set; (2) determining the following object as the reference object; and (3) executing the step B. The step D includes: (1) using the processor processes the information set to generate a computational result.

This disclosure presents an embodiment of a method for augmented reality interaction, using a camera and a processor to recognize at least one object in an image. The object includes content information and a plurality of operational direction information. the plurality of operation direction information includes an inspection direction, a re-inspection direction, or a combination thereof. The interactive method includes a steps M, a step Q, and a step R. The step M includes: (1) providing an information set to store the content information, the plurality of operation direction information, or the result of the processing and computation executed by the processor on the at least one object. The step Q includes: (1) if the processor recognizes a plurality of objects in the image and the following conditions are met (A) one of two objects of the plurality of objects is adjacent to other one of the two objects in the inspection direction, and (B) the inspection direction of the one of the two objects is opposite to the re-inspection direction of the other one of the two objects, then (3) using the processor to store the content information of the two objects into the information set. The step R includes: (1) using the processor to return the information set and generate a computational result.

This disclosure presents an embodiment of a method for augmented reality interaction using a camera and a processor to recognize at least one object in an image. The at least one object includes a content information and a plurality of operation direction information. The plurality of operation direction information includes an inspection direction, a re-inspection direction, or a combination thereof, wherein the method comprises a step P, a step Q', and a step R. The step P includes: (1) if the processor recognizes that the number of the at least one object in the image is singular, using the processor to store the content information of the at least one object into an information set corresponding to the at least one object. The step Q' includes: (1) if the processor recognizes that the number of the at least one object in the image is plural, and the following conditions are met: (A) two objects of the plurality of objects are adjacent to each other, (B) one of the two objects is adjacent to another one of the two objects in the inspection direction, and (C) the inspection direction of the one of the two objects is opposite to the re-inspection direction of the another one of the two objects; (2) then using the processor to store the content information of the two objects in the information set. The step R includes: (1) using the processor to return the information set and generate a computational result.

The embodiments of the present disclosure will be described in detail with reference to the drawings. It should be noted, as per standard industry practices, that various features are not drawn to scale and are merely illustrative examples. Indeed, the sizes of the components can be arbitrarily enlarged or reduced to clearly show the features of the disclosure.

DETAILED DESCRIPTION OF THE INVENTION

Figure 1:
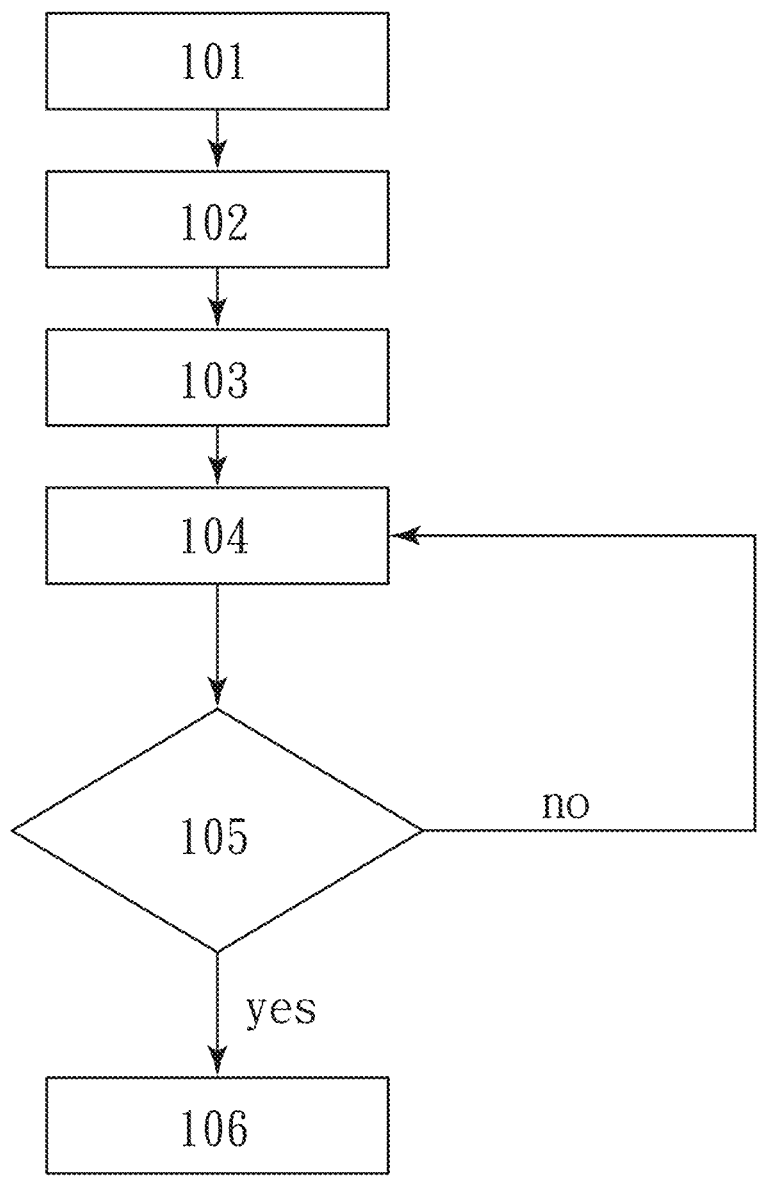
FIG. 1 is a flowchart illustrating a method according to some embodiments of the present disclosure.

The following discloses a variety of different methods or examples for implementing the various features of the subject matter provided herein. The embodiments described in detail with respect to specific components and their arrangements are intended to illustrate the present disclosure. These embodiments are provided by way of example and are not intended to limit the scope of the present disclosure. Furthermore, the same reference numerals or designations can be used throughout different embodiments for the sake of clarity and simplicity of the description, and do not imply any particular relationship between the discussed different embodiments and/or structures.

To address the aforementioned issue of instability in detecting assemblies of two or more card patterns simultaneously, some embodiments of the present disclosure provide a method 100 for solving the problems. FIG. 1 illustrates a flowchart of method 100 according to some embodiments of the present disclosure. For example, method 100 can capture 2D objects using a photographic device and display them in a 3D manner on a display device. In some embodiments, method 100 can be used for educational learning and the alike. For instance, it can increase motivation for educational learning through innovative augmented reality interaction mechanisms. In addition, the ability to memorize while learning can be enhanced through interactive processes and visual impressions. The scope of application includes, but is not limited to, language phonetics, natural sciences, mathematical formulas, geography, etc. Moreover, method 100 can also be applied in entertainment, such as in card tabletop (board) games, role (character)-playing games, public figure image development, etc., thereby helping to extend the application of the brand of virtual characters or public figures, which enhances brand value.

Firstly, at step 101, an object (such as a letter card) can be captured as a 2D image. Here, the object can be a card or any other object that contains image information. In some embodiments, various photographic devices, such as mobile phones, cameras, AR glasses, MR glasses, tablets, laptops, and other equipment with photographic capabilities, can be used for capturing. Further elaborating, implementing this technology can be facilitated by devices supporting ARKit or ARCore for iOS/Android platforms.

At step 102, the captured 2D image can be integrated with a pre-established 3D scene. At step 103, during integration, the 2D image captured can be transformed into coordinate positions in the 3D scene, for example, by determining the 'axes' and 'distance' through algorithms, aforesaid details that can be termed as information set. Then, at step 104, a first result concerning this information set is displayed. At step 105, it is determined whether the information set complies with the principles of assembly. If it complies, then at step 106, a second result is displayed, for example, corresponding 3D data can be sent to the screen of a mobile device. If it does not comply, then the process returns to step 104 for re-determine. In some embodiments, the information set can also be used to store other information such as content information, operation direction information, or the results of the processor's processing operations on objects, etc.

Figure 2:
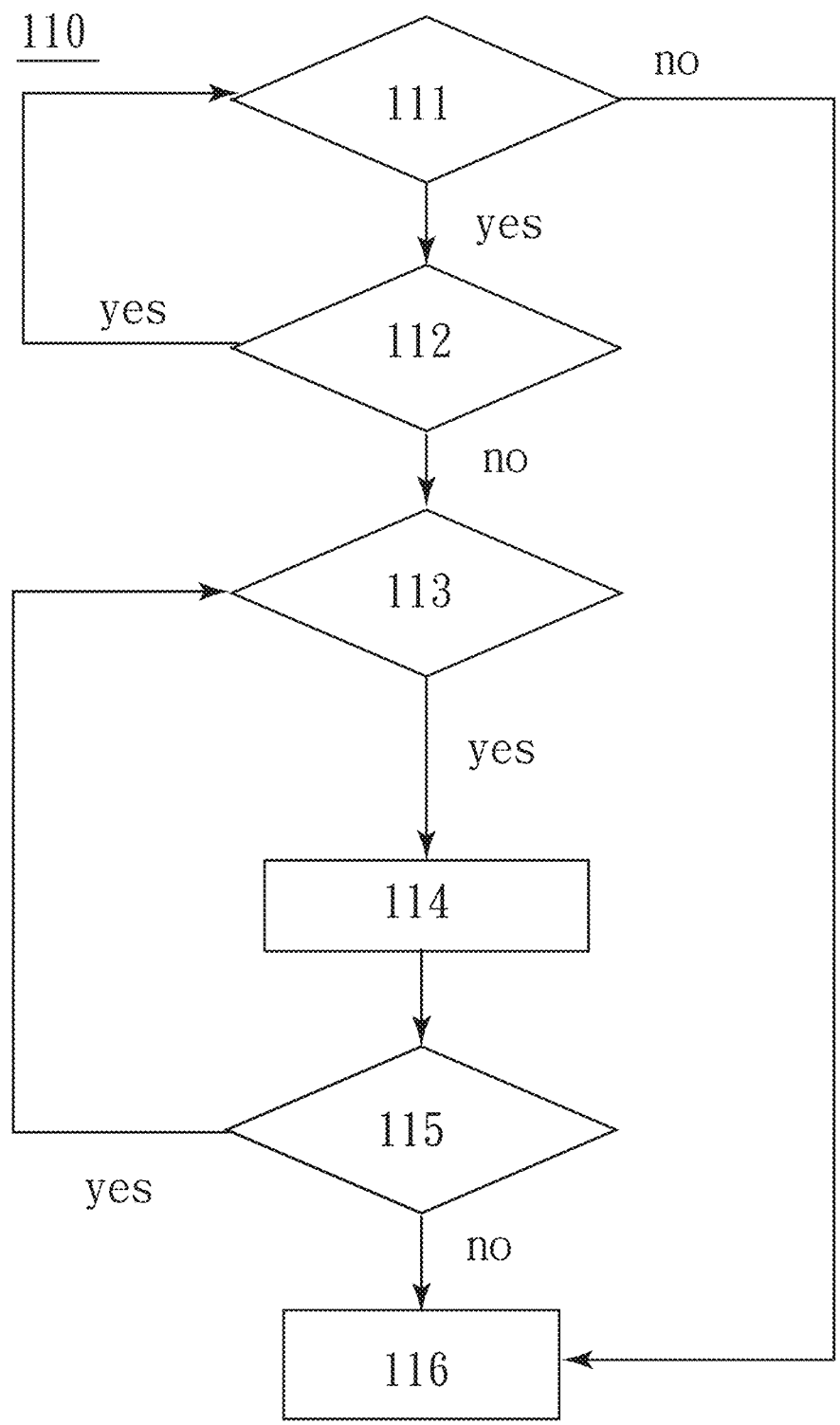
FIG. 2 is a flowchart of the method.
Figure 3:
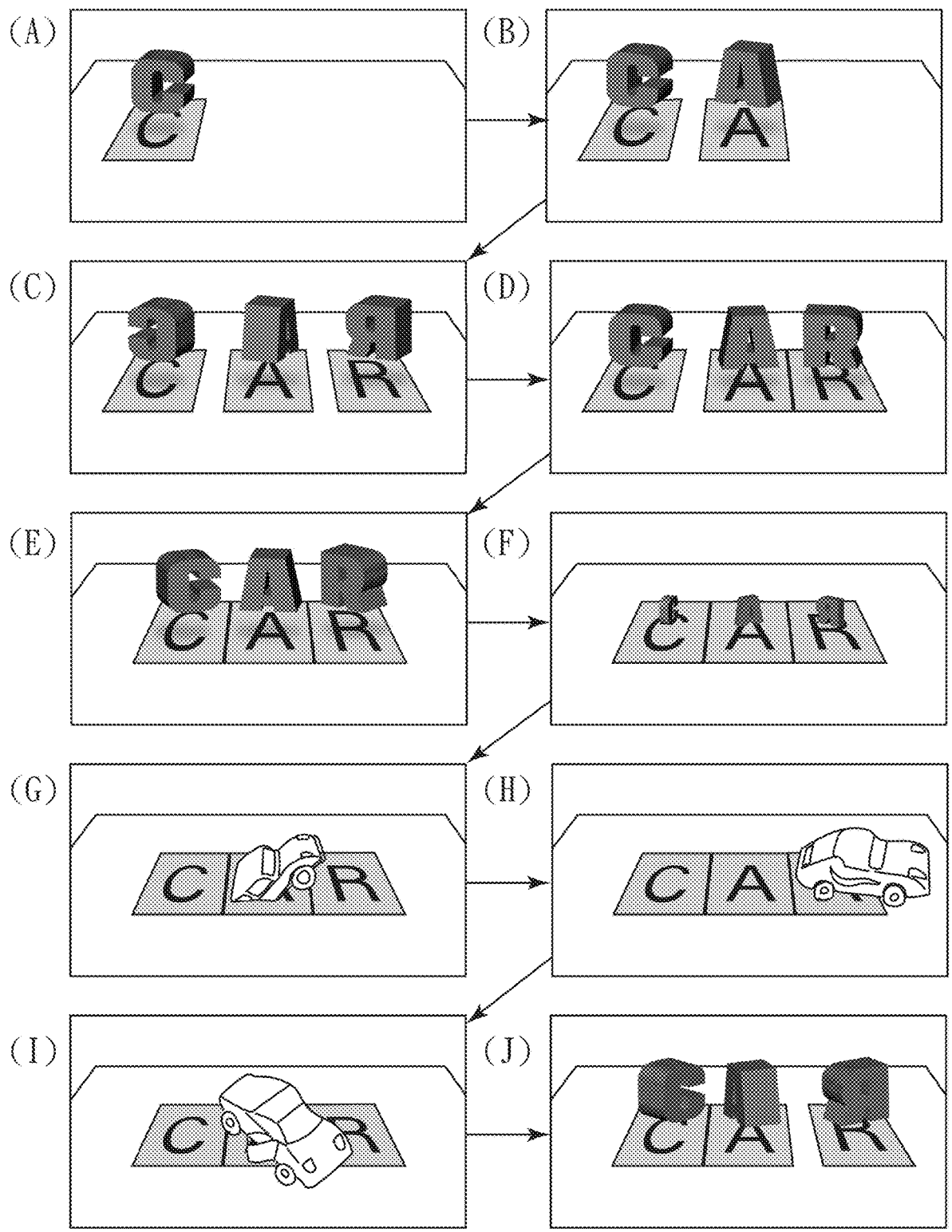
FIG. 3 is a schematic diagram of the method applied in practice.

Subsequently, the details of step 105 of method 100 are explained with various embodiments. For example, FIG. 2 is a flowchart of method 110, which illustrates the details of step 105. FIG. 3 is a schematic diagram of the practical application of method 110. For instance, if the letter cards 'C', 'A', 'R' are arranged in sequence, a 3D image of a vehicle can be generated. In FIG. 3(A), the C letter card is placed, and the photographic device along with the processor is used to recognize the content information of each letter card (such as inspection direction and re-inspection direction that will be mentioned later). Then, in FIG. 3(B), the A letter card is placed, at which point method 110 proceeds to step 111, executing the first inspection step to generate the first inspection result. In some embodiments, the first inspection step includes using the processor to examine whether other letter cards are adjacent to the C letter card in the inspection direction of the C letter card.

In some embodiments, the inspection direction can be defined as the right side of a letter card when the letter card is placed correctly to a person for recognition, but is not limited to this. In some embodiments, the inspection direction can include the reading direction of English words, the reading direction of Chinese words, the placement orientation of equipment slots for character objects, or a combination thereof. For example, when there is a relation between objects, this method can be utilized. If applied in a tabletop (board) game, for instance, a "character object" is presented on the object showing the character's back direction or orientation, and then a "backpack object" can be equipped on the character's back direction or orientation. Further, the backside of the "backpack object" can then be equipped with a "water bottle object." In this case, the rear direction of mentioned character and mentioned backpack defines the inspection direction.

It should be noted that since the distance between the C and A letter cards is not close enough at this moment, the first inspection result determined in step 111 will be negative, thus stopping the operation and generating a computational result. For example, an image rendering step can be executed to display content information on a display device, such as using an AR screen device (including smartphones, tablets, AR glasses, etc.), to form 3D images of the letters "C" and "A" respectively above the C and A letter cards. Then, in FIG. 3(C), with the further addition of the R letter card, since the distance between the R letter card and other letter cards is also not close enough, the determination result of step 111 remains negative, similarly forming a 3D image of the letter "R" above the R letter card. The method 100 provided in these disclosed embodiments can track more than ten image recognition assemblies within the camera's visible range.

Subsequently, in FIG. 3(D), the distance between the A and R letter cards is decreased. At this point, step 111 will determine that there is an adjacent R letter card in the inspection direction of the A letter card, thus the first inspection result is affirmative. The method 110 then proceeds to step 112, where the processor examines whether there are other letter cards adjacent in the re-inspection direction of the A letter card, to generate a second inspection result. In some embodiments, the re-inspection direction can be defined as the left side of the letter card when the card is placed correctly to a person for recognition, but is not limited to this. Since the A letter card does not have the C letter card adjacent on its left side at this moment, the second inspection result is negative. If the second inspection result is affirmative, then return to step 111 to determine another letter card. For example, in FIG. 3(E), if the determination starts from the A letter card, step 112 will determine that the C letter card is adjacent on the left side of the A letter card, thus step 111 is re-executed for the C letter card.

It is important to note that the adjacency mentioned here does not necessarily mean that two objects (letter cards) must be completely adhered. In some embodiments, the first re-inspection step has a tolerance value when examining, and when the object is plurality, the aforementioned adjacency refers to the distance between the inspection direction of an object and the re-inspection direction of other one object within a virtual plane or virtual three-dimensional space falling within the tolerance value. In some embodiments, the tolerance value can include a distance tolerance value, where the distance between said two objects falling within the distance tolerance value. If the distance exceeds the preconfigured tolerance value, the computation will not continue in order to save computational efficiency.

Figure 16:
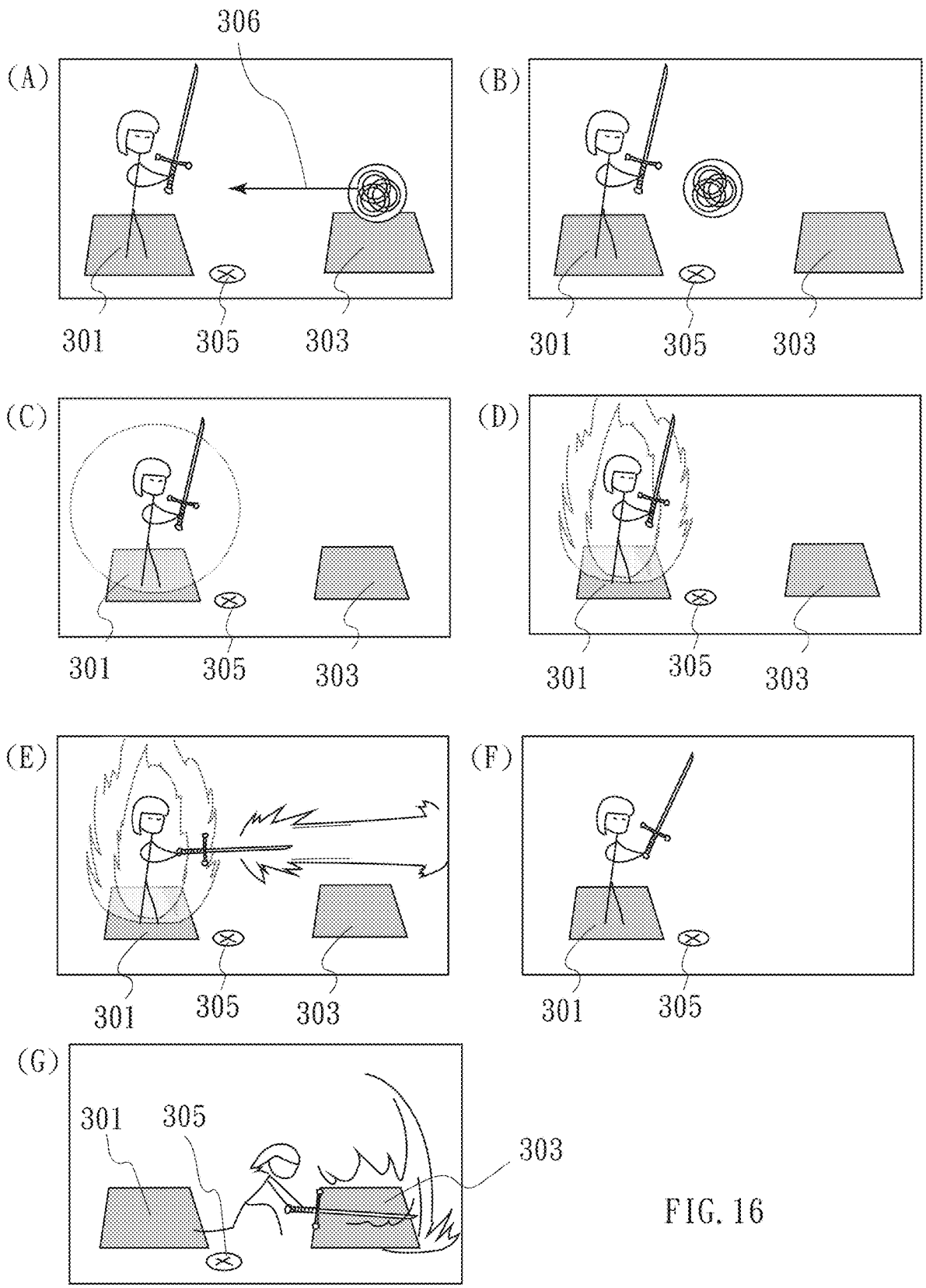
FIG. 16 is another schematic diagram of an example of applying this method in further embodiments of the present disclosure.
Figure 17:
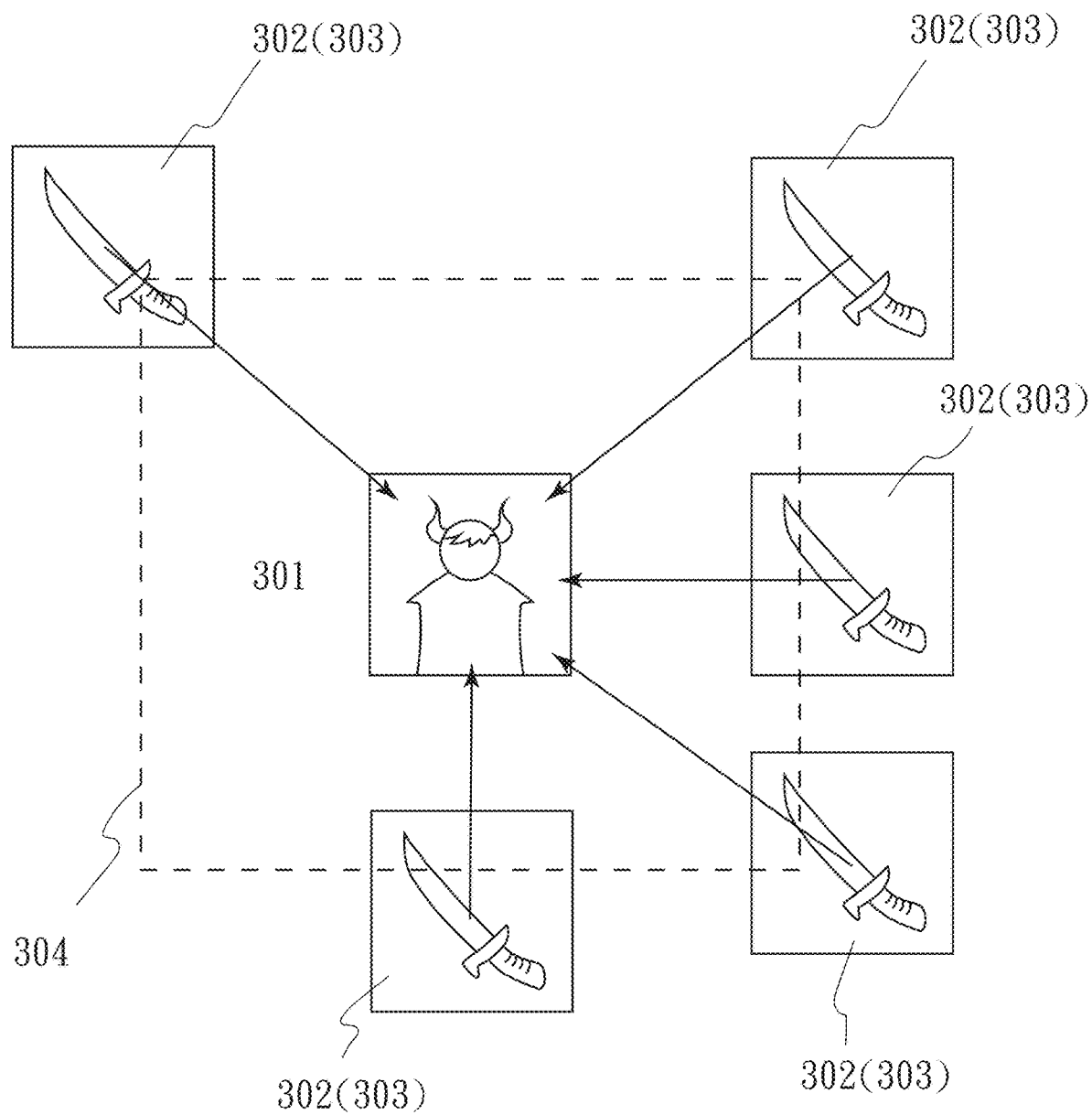
FIG. 17 is a schematic diagram when equipping a character card with a weapon card or energy card.

The aforementioned distance can be based on the center points of adjacent two objects as a basis for measuring the distance, or it could be based on the shortest distance between the two objects, or could be based on preconfigured distance reference points on the two objects, where the distance is calculated between the reference points of the two objects. In some embodiments, the aforementioned distance tolerance can be between 0 to 5 centimeters; for instance, the edge of one object of the plurality of objects can be less than 5 centimeters away from the nearest point of other one object, though this range is not limiting. In other embodiments, different distance tolerances (e.g., less than 10 centimeters) can be implemented, depending on design requirements. For example, when one of two objects displays content information such as magic orbs, amulets, etc., in a card game, these amulets or magic orbs, once displayed on the display device, can "move" or "orient" towards the other object over a certain distance. Refer to FIG. 16, for example, when the energy card 303 and the character card 301 combine, as shown in FIGS. 16(A) and (B), the 3D object of the energy card can move directionally towards the character card. Furthermore, as shown in FIG. 17, when the equipment card 304 or the energy card 303 is within the range of distance tolerance, its 3D object can move directionally towards the character card 301. In some embodiments, corresponding outcomes, such as animations, can be produced when the distance tolerance falls within different ranges; for instance, the processor can generate different computational results when two objects are within 0-5 centimeters, 5-10 centimeters, and 10-15 centimeters, achieving a variety of effects.

In some embodiments, the tolerance values can include an angle tolerance, in which case a pairing relationship between the inspection direction and the re-inspection direction refers to the angle between these directions falling within the angle tolerance. For example, the angle tolerance can be between 0 degrees to 15 degrees, or between 80 degrees to 110 degrees, but this is not limited to it. In other embodiments, any arbitrary angle can be preset to achieve the objectives of the method. For example, a broader tolerance value can be configured to allow for a pairing relationship between two objects in all directions, thus affording the user a larger margin for error. By way of illustration, multiple distance values can be designed to allow for various assemblies between two objects: for instance, if the distance between two objects is 5-10 centimeters, a first set of results or animations can be produced. If the distance is between 0-5 centimeters, a different set of results or animations can be produced. By such configurations, in addition to the properties of the objects themselves, the distance between the objects can also be leveraged to add versatility to the application, enhancing its multidimensionality.

In some embodiments, the angle can be determined using the following formula:

$$\cos\theta = \frac{\vec{a}\cdot\vec{b}}{|\vec{a}||\vec{b}|} = \frac{a_1 b_1 + a_2 b_2}{\sqrt{a_1^2 + a_2^2}\cdot\sqrt{b_1^2 + b_2^2}} \quad (1)$$

Additionally, the distance can be determined using the following formula:

$$|AB| = \sqrt{(X_1-X_2)^2 + (Y_1-Y_2)^2 + (Z_1-Z_2)^2} \quad (2)$$

In other words, given the known positional coordinates of two objects, the distance and angle between two cards can be determined using the above Equations (1) and (2).

Figure 4:
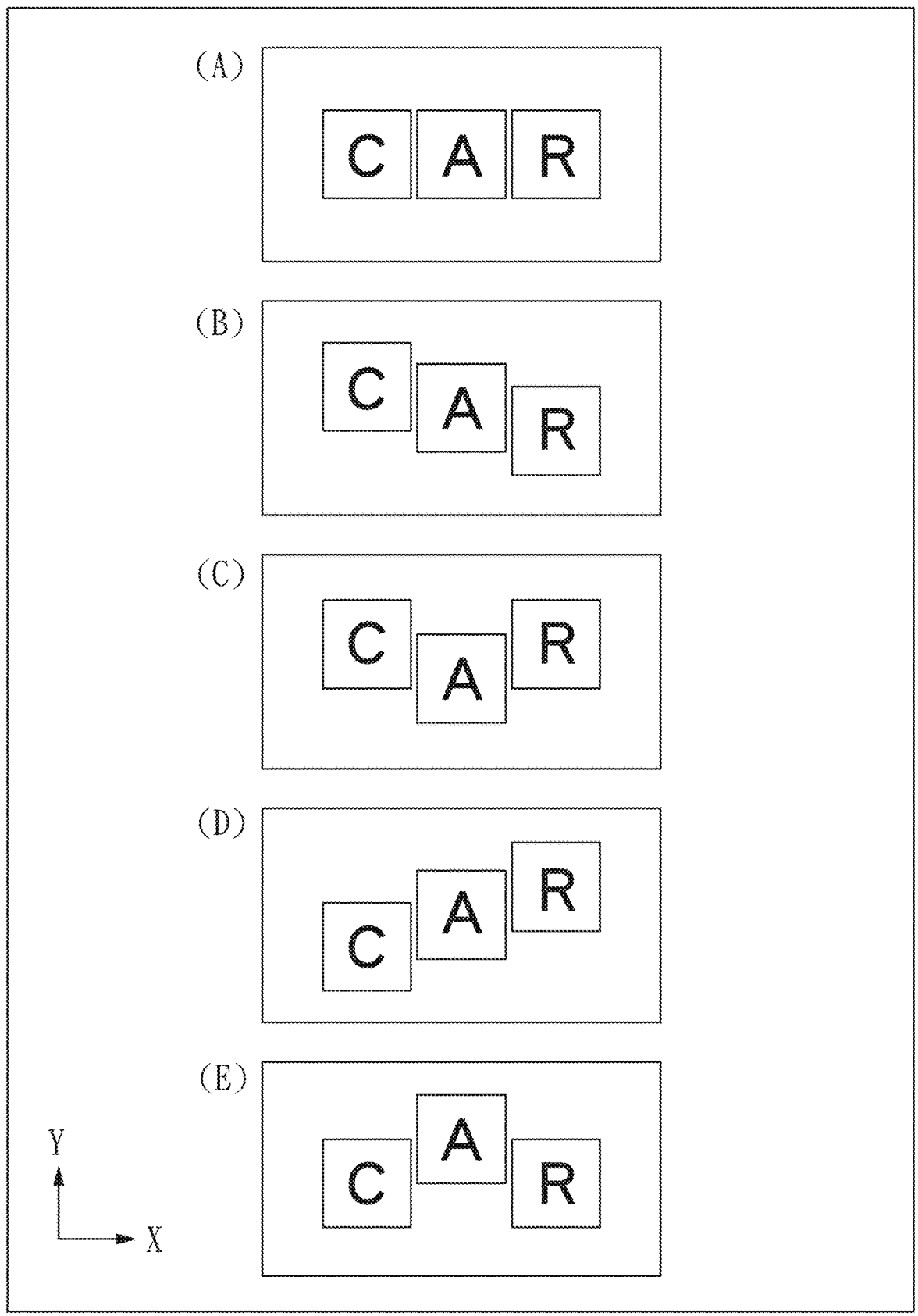
FIG. 4 is a schematic diagram of various adjacent objects according to some embodiments of the present disclosure.

For instance, FIG. 4 illustrates schematic diagrams of various adjacent objects according to some embodiments of the present disclosure. In FIG. 4(A), the letter cards C, A, R are arranged in sequence along the X-axis and have substantially the same Y-coordinate. In FIGS. 4(B) to 4(E), the letter cards C, A, R are also arranged in sequence along the X-axis, but their Y-coordinates are not identical. In such circumstances, the inspection direction can be the +X direction, while the re-inspection direction can be the −X direction, but not limited thereto. That is, in the Y direction, there can be a tolerance value between the letter cards, allowing users to display the desired image without needing to perfectly align each letter card.

It should be noted that if the first inspection result is affirmative and the second inspection result is negative, meaning that an object of at least one object in the inspection direction of the object is adjacent to any one object of the at least one object, and the object of the at least one object in the re-inspection direction of the object is not adjacent to any other object. It indicates that the letter card A is the first in the sequence of arranged letter cards, hence at this moment, the letter card A can be defined as the "leading object". With a leading object recognized, a comparison of other objects (hierarchical relationship) can be executed. For example, in English alphabetical sorting, the letter at the beginning is the leading object because there are no other objects in the re-inspection direction of that leading object. However, in some embodiments, the object may not need to satisfy the aforementioned conditions to be a leading object. For instance, the leading object could be preconfigured with content information as a character object recognized by a processor, a building base object, or other similar objects that can be modified. It is also noteworthy that in some scenarios, there can be a plurality of sets of adjacent cards, whereby there can be a plurality of leading objects. In some embodiments, the leading object can also be referred to as a header object, a base object, or a character object, etc. The base object can have different facility objects constructed around it; the character object can be equipped with various equipment objects, and so forth.

Note that if the first inspection result in step 111 is negative, that is, if initially it is determined that there is no other letter card to the right of a letter card, subsequent determination (such as examining whether there is any letter card to the left of the letter card) will not be executed, thereby saving the processor's operating time and improving computational efficiency. Moreover, step 111 will continue to examine whether other objects (letter cards) meet the requirements of step 111.

Next, method 110 proceeds to step 113, where the processor executes a first re-inspection step based on the order in which the letter cards are placed, again referring to FIG. 3(D), at this point the processor examines whether the inspection direction of the letter card A and the re-inspection direction of the letter card R conform to a pairing relationship. (In terms of system execution, this means the processor asks the card to the right of letter card A (i.e. R) to inquire which card is to the left of letter card R; if it confirms that letter card A is also to the left of letter card R, then a pairing relationship can be confirmed.) For example, an order like "CA" and "AR" can be defined as pairing relationships, although other order (such as "RC", "RA", etc.) also match, since these orders are not stored in the database, no result is generated from the comparison to the database, and therefore, only the images of the sole R and the sole C letters are displayed. Since at this time letter cards A and R conform to a pairing relationship, the processor processes the content information of the letter cards A and R to generate a computational result, such as a successful match or a failed match. An example of a successful match is shown in FIG. 3(D) with letter cards A and R, while an example of a failed match can be referred to FIG. 6(A) where the cards are placed askew or when the axial positions differ. Furthermore, letter card A is set as a reference object, and letter card R is set as a following object. It should be noted that if the result of matching does not conform to a pairing relationship, the processor will stop executing the first re-inspection step. In some embodiments, the placement order can include the order in which at least one object is arranged according to the inspection direction it belongs to, the order in which at least one object is arranged according to the inspection direction of a leading object, or a combination thereof.

In some embodiments, a following object can be adjacent to a reference object in the re-inspection direction it belongs to. In some embodiments, the leading object can be the one that starts to execute the first re-inspection step or the first inspection step, where the inspection direction of the leading object is the direction in which the processor executes the first re-inspection step or the first inspection step on at least one object.

In some embodiments, the processor can store the aforementioned pairing relationship into an information set, thereby generating computational results according to the information set. In some embodiments, the processor can also not to execute the storage action to speed up operational efficiency. In some embodiments, if the pairing relationship is conformed, the processor can update the content information of this object (which the content information can be null). In some embodiments, content information, inspection direction, and re-inspection direction can exist independently. That is, in some scenarios, there is not content information in an object, but can have a plurality of operational direction information, for example, objects with only a plurality of operational direction information, such as a construction base and character cards. In some embodiments, a plurality of operational directions can include inspection areas (for example, including a virtual plane, virtual three-dimensional space recognized by the processor in the image, or their combination, or including the object's X-axis, Y-axis, Z-axis in the virtual three-dimensional space, or their combination), and when any object is included in the object's inspection area, the first re-inspection step is executed.

Next, at step 114, the processor configures the reference object (A letter card) as a inspected object, and configures the following object (R letter card) as the reference object. Then, at step 115, the second inspection step is executed to determine whether there are other letter cards behind the current reference object (R letter card). That is, it is determined whether there are any other letter cards adjacent in the inspection direction of the reference object (R letter card). At the state of FIG. 3(D), there are no other letter cards behind the R letter card, so step 115 does not pass, thus moving to step 116 to end the operation of method 110, thereby displaying the result after computation. In some embodiments, if the R letter card is the last card, then it will not become the reference object. The reason is that when the processor executes the first inspection step on any object and the result is negative, it will stop computing directly, and the first inspection result of the R letter card is negative. Thereby, it is possible to avoid re-executing step 113 and save computational resources required for the computation.

However, since at this time only the A letter card and R letter card adhere to each other but without forming a complete word, the computational result at this time remains the display of the 3D images of the A and R letter cards.

Next, in FIG. 3(E), the C letter card is brought closer. Similar to the aforementioned logic of determination, after passing step 111 and at the end of step 112, the C letter card is determined as the leading object, and at step 113 the A letter card is determined as the following object. Then at step 114, the C letter card is configured as the inspected object, the A letter card is configured as the new reference object, and the R letter card is configured as the new following object. Since there is still an R letter card behind the A letter card at this time, the computational result of method 110 at step 115 will pass (there is other object behind the reference object), thus returning to step 113 to continue determining the subsequent A and R letter cards until the entire string is determined. In some embodiments, that is, when a plurality of objects are arranged, the processor can repeat steps 113, 114, 115 until the last object is determined (the R letter card in FIG. 3(E)), at which time the computation can stop and it is not necessary to repeat the aforementioned steps to save computational resources required for the computation.

Then, referring to FIG. 3(F) to 3(I), since the processor has determined that the C, A, R letter cards are arranged in order, the determination result (the second result of method 100) will cause the original 'C', 'A', 'R' 3D images to shrink and disappear (FIG. 3(F)), and display the 3D image of a vehicle (FIG. 3(G) to 3(I)) to inform the user that this assembly of letter cards is a correct assembly. Then in FIG. 3(J), when the R letter card is moved away, method 110 will determine that although "C" and "A" are correctly arranged, the processor cannot recognize the word formed by the arrangement and thus cannot match it against the database content, resulting in the absence of the corresponding car image. However, this disclosure is not limited to this. For example, if a user removes any one of the objects in recognized images (such as any one of the C, A, R letter cards), the processor can still recognize the content information within the image and display it on a display device. For instance, if the R letter card is removed, although the 3D image of a vehicle will not be displayed above the C and A letter cards, the 3D images of the C, A, and R letters can still be shown. It should be noted that at this time, the user can simultaneously see the information of the object itself as well as the corresponding image of the object. By this means, users are allowed to learn with the assistance of images.

Since method 110 determines only one object (letter card) at a time, it allows the data of each object to be processed independently, thereby saving computational resources and avoiding an impact on the performance of displaying.

In some embodiments, the aforementioned content information can include model information, three-dimensional model information, character model information, sound information, digital media information, word character information, content recognition information, verification information, virtual object information, encryption information, interaction command information, or a combination thereof. In some embodiments, the aforementioned content information can also be a null value. In some embodiments, the content information includes interactive objects that allow users to interact with the objects. For example, interactive objects can be printed on the surface of the object, such as interactive elements printed on the character images of board games, so that in operation, interactive elements can serve as precise tracking points for finger presses or interactions, and can also be used to obscure specific areas and achieve image recognition effects. Another example is that interactions can be facilitated by the graphic design on the object, by configuring a specific area on the character object, where users can achieve a new way to play by obscuring specific areas of the image, allowing the processor to detect new images and hence create a new combined gameplay.

In some embodiments, the aforementioned processor can comprise a general-purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, such as a complex instruction set computer (CISC) microprocessor, a reduced instruction set computing (RISC) microprocessor, and/or a very long instruction word (VLIW) microprocessor or other processing devices. The processor can also include a controller, a microcontroller, an application-specific integrated circuit (ASIC), a field-programmable gate array (FPGA), a programmable logic device (PLD), among others.

Figure 5:
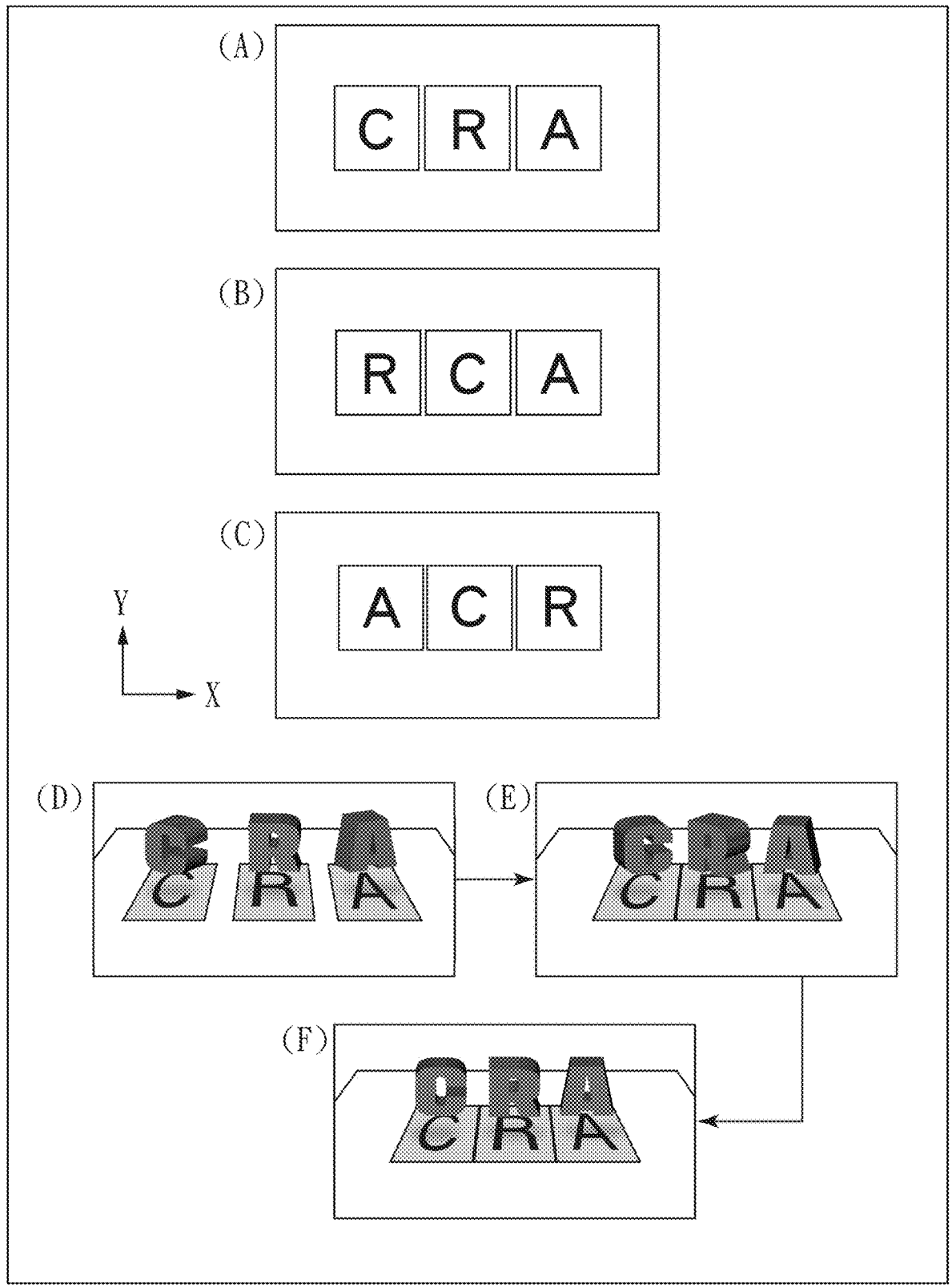
FIG. 5 is a schematic diagram when there is an incorrect in the arrangement of some objects in the embodiments of the disclosure.

FIG. 5 illustrates schematic examples of incorrect object arrangements according to some embodiments of the present disclosure. As shown in FIG. 5(A) to 5(C), although the C, A, R letter cards are arranged in the X direction, the sequence does not form the word CAR, i.e., their hierarchical sequence does not match the data in the corresponding database. In such a scenario, the determination result at step 114 would be negative. Consequently, as shown in FIG. 5(D) to 5(F), even if the three letter cards are brought closer together, only the 3D textual images of C, A, R will be displayed, not the vehicle.

Figure 6:
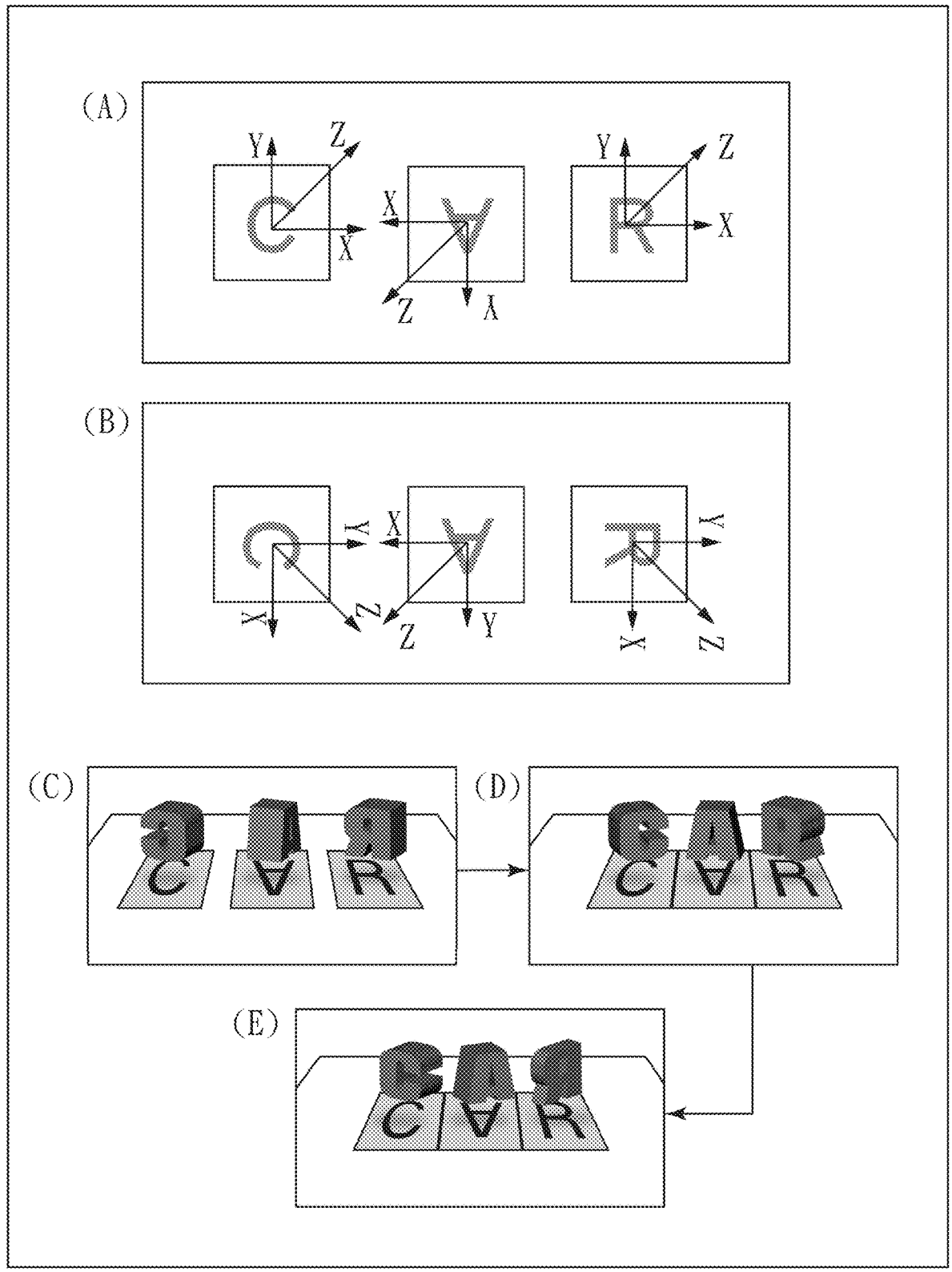
FIG. 6 illustrates schematic examples of incorrect object arrangements according to some embodiments of the present disclosure.

FIG. 6 illustrates schematic examples of incorrect object arrangements according to some embodiments of the present disclosure. In this situation, the orientation of the letter cards does not fully comply with the aforementioned rules. For example, the inspection direction can be defined as the +X direction of the letter card, and the re-inspection direction can be defined as the −X direction of the letter card. As shown in FIG. 6(A), the A letter card can be found in the inspection direction of the C letter card, but the C letter card is not found in the re-inspection direction of the A letter card. Instead, in the re-inspection direction (−X direction) of the A letter card is the R letter card, indicating that these two objects do not conform to the pairing relationship. At this point, the result of step 113 would not be passed. Moreover, as shown in FIG. 6(B), there are no letter cards in the inspection direction of the C letter card. The C letter card is in the inspection of the A letter card direction is, but no letter cards are found in the re-inspection direction of the C letter card, which does not conform to the pairing relationship, hence the result at step 111 would neither be passed. Thus, as shown in FIG. 6(C) to 6(E), even if the three letter cards are brought closer together, only the 3D textual images of C, A, R will be displayed, not the vehicle.

Figure 7:
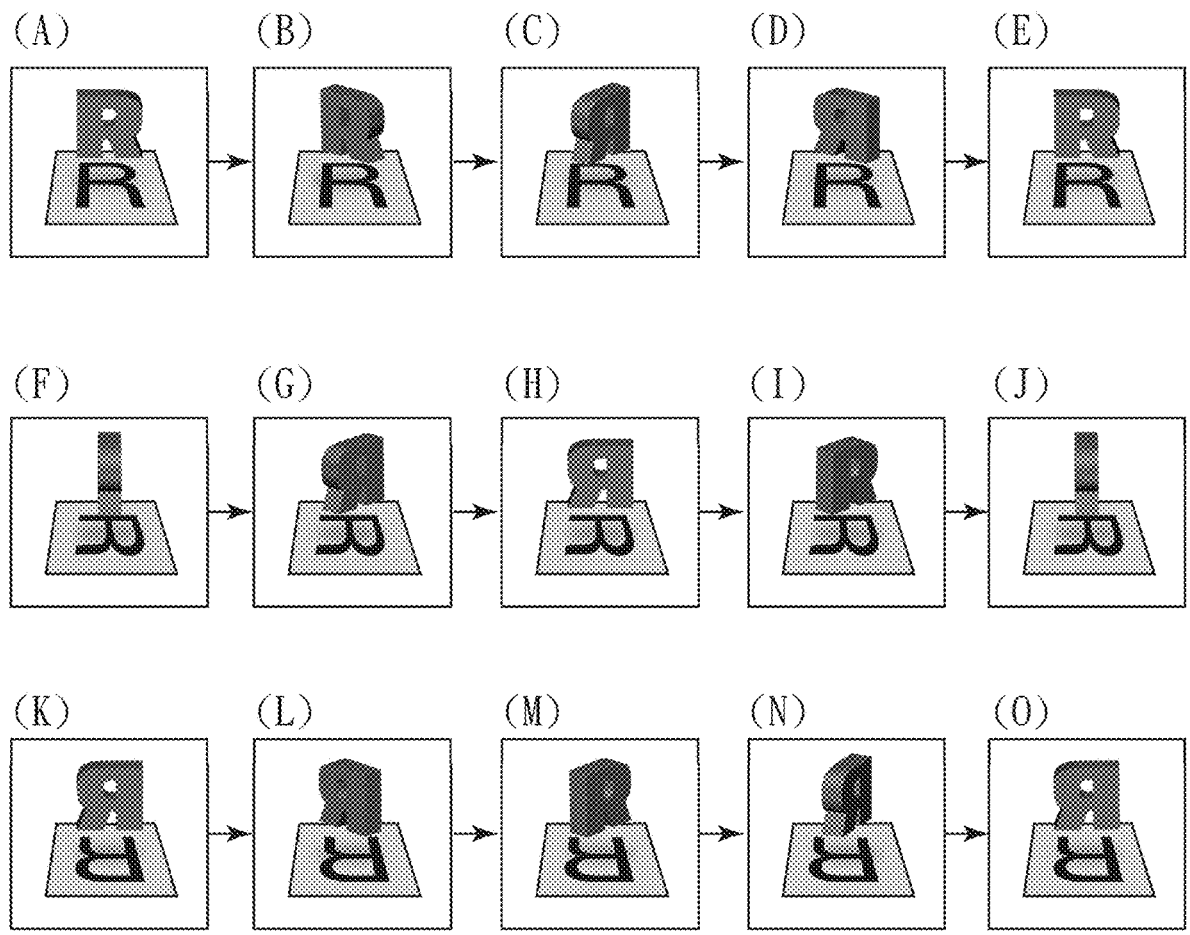
FIG. 7 illustrates a schematic of the 3D image when objects are arranged according to some embodiments of the present disclosure.

In some embodiments, a 3D text image can be rotated during display to allow users to determine if their orientation is correct. For example, FIG. 7 illustrates a schematic of the 3D image when objects are arranged according to some embodiments of the present disclosure. As shown in FIG. 7A to FIG. 7E, since the orientation of placement is correct, the correct "R" letter is visible at the start and end points of the animation display. However, as depicted in FIG. 7(F) to 7(J) and 7(K) to 7(O), in these two scenarios, the orientation of the R letter card is not directly facing the user, hence the correct "R" letter cannot be seen at the start and end points of the animation display. This feature helps users in determining the correct orientation for placement or arrangement.

Figure 8:
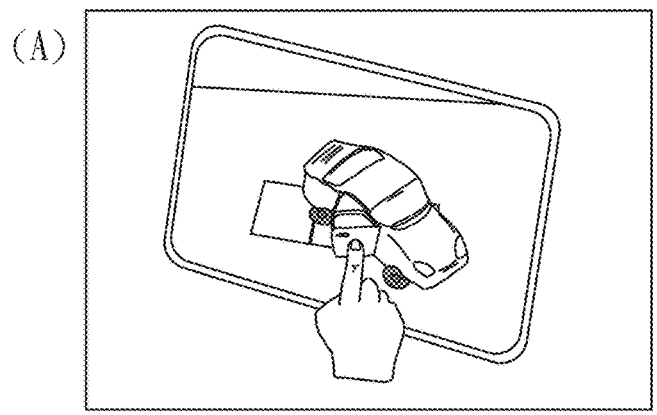
FIG. 8 is a schematic diagram of a user interacting with 3D objects.
Figure 8:
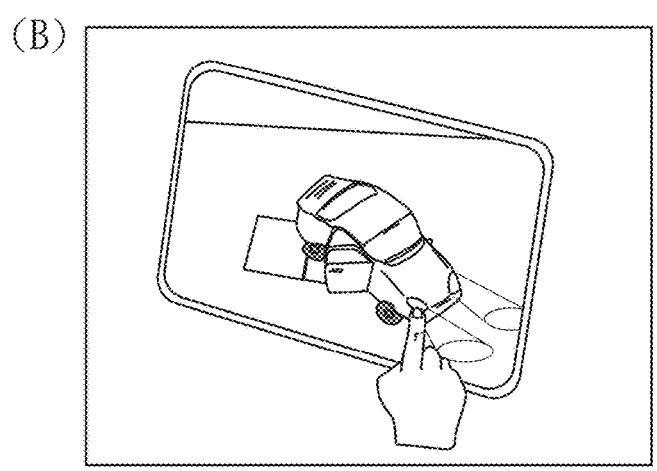
Figure 8:
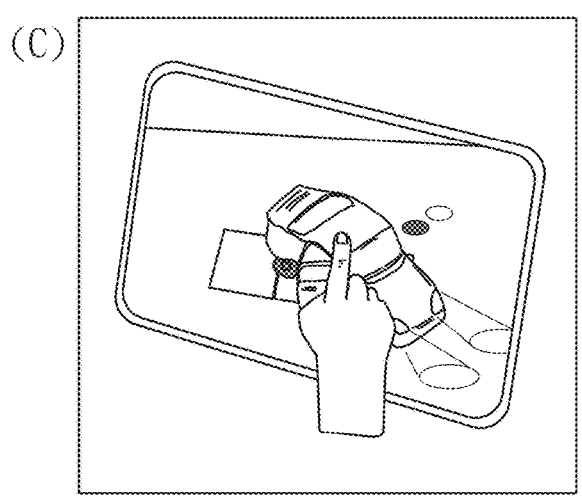
Figure 8:
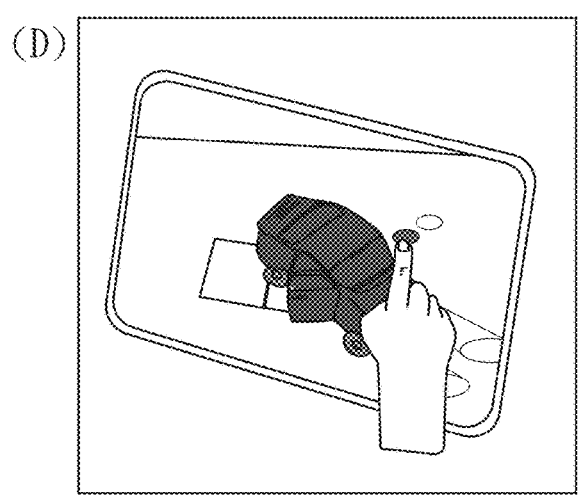

In some embodiments, the user can interact with the 3D object using gestures, which include covering, rotating, tapping, clicking, multi-touch, moving, or swiping the object. Interaction with the 3D object displayed on the screen includes operations such as tapping, clicking, multi-touch (including rotation), and moving. During interaction, the processor can update the content information of this object. For example, FIG. 8 illustrates a schematic of a user interacting with 3D objects (the aforementioned vehicle). As shown in FIG. 8(A), the vehicle's door can be opened with a gesture. It should be noted that although a tablet is used as the display device here, the disclosure is not limited to this. Other iOS/Android display devices that support ARKit or ARCore, such as smartphones, AR glasses, laptops, monitors, TVs, etc., can also be used. In FIG. 8(B), the vehicle's headlights can be turned on. In FIG. 8(C) and FIG. 8(D), the color of the vehicle can be changed. Thereby, the possibility of user interaction with the object is provided.

Figure 9:
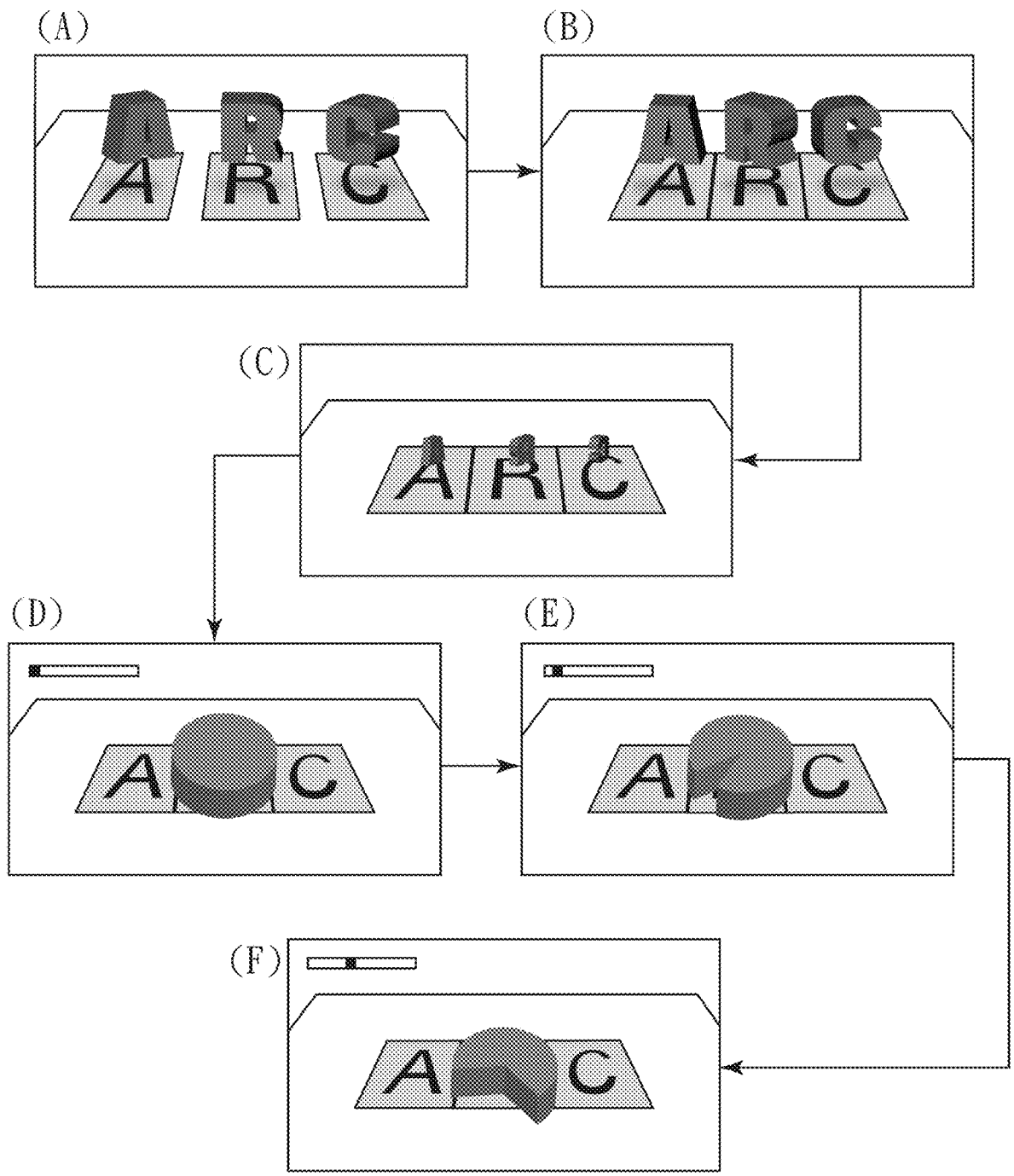
FIG. 9 is a schematic diagram of the arrangement of some objects in the embodiments of the present disclosure.

Although the previous examples illustrate the formation of a vehicle image by sequentially arranging the C, A, R letter cards, the present disclosure is not limited to this. For example, FIG. 9 is a schematic diagram of the arrangement of some objects in the embodiments of the present disclosure. As shown in FIG. 9(A) to FIG. 9(F), the A, R, C letter cards arranged in sequence can also create the word "ARC," thereby displaying a 3D animation of an arc length.

Figure 10:
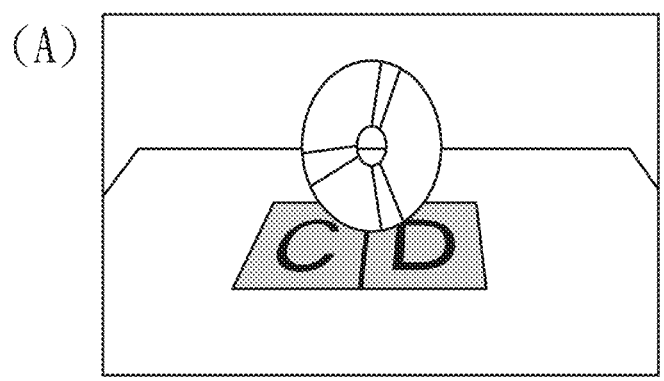
FIG. 10 is a schematic diagram of the arrangement of some objects in the embodiments of the present disclosure.
Figure 10:
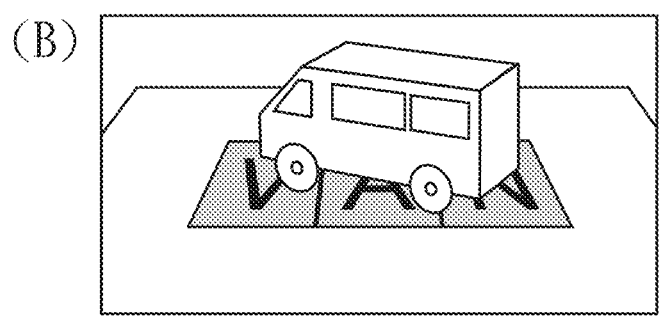

In some embodiments, additional cards can also be included. For instance, FIG. 10 is a schematic diagram of the arrangement of some objects in the embodiments of the present disclosure. As shown in FIG. 10(A) to FIG. 10(D), an additional D letter card can be added to form the word "CD" with the C letter card. As illustrated in FIG. 10(E) to FIG. 10(J), additional V, N letter cards can also be added to form the word "VAN" with the A letter card. Thus, more assembly options are provided to the user.

Figure 11:
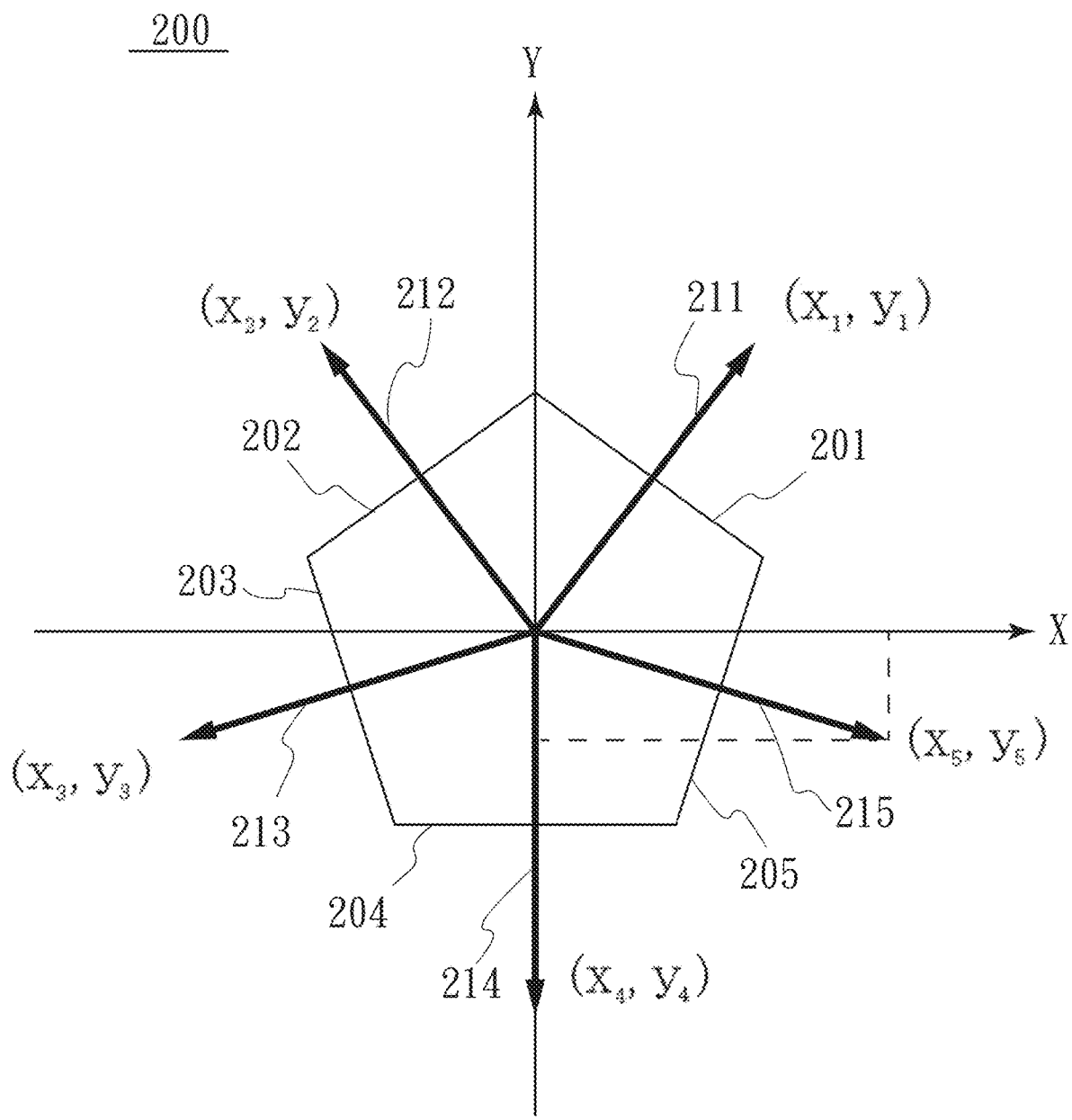
FIG. 11 is a schematic diagram of a polygonal object in some embodiments of the present disclosure.

It should be noted that although the foregoing embodiments have been described using rectangular cards having word letters as examples, the present disclosure is not so limited to the shape. For instance, it can be applied to any polygonal objects. FIG. 11 is a schematic diagram of a polygonal object 200 according to some embodiments of the present disclosure, with a pentagon being represented here for illustrative purposes. In some embodiments, the inspection direction of the polygonal object 200 can include inspection vectors, while the re-inspection direction can include preconfigured re-inspection vectors. It is noted that the inspection vectors and the re-inspection vectors can include information regarding "direction" and "magnitude" (vector length) to serve as a basis for pairing relationships, inspection step, or re-inspection step. Additionally, virtual coordinates can be assigned to a plurality of objects to establish a relationship of relative positions between them, serving as a basis for determining a pairing relationship, inspection step, or re-inspection step. For example, the difference in coordinate information of two objects can be used to calculate the relative distance and thereby determine their relative positions.

As shown in FIG. 11, the perpendicular directions of each edge length of the object can serve as inspection directions, re-inspection directions, or a combination thereof. For instance, a pentagon can include five edges 201, 202, 203, 204, 205 and five vectors 211, 212, 213, 214, 215, each perpendicular to the respective edges 201, 202, 203, 204, 205. Furthermore, if vectors 211, 212, 213, 214, 215 represent inspection directions or re-inspection directions, objects can be given axial information by preconfigured, and these vectors 211, 212, 213, 214, 215 can configure as inspection directions. Thus, when polygonal objects 200 are arranged relative to each other, their arrangement can be determined to comply with pre-configured information according to the methods 100 and 110 as described above.

In some embodiments, the pairing relationship can refer to a pre-configured inspection threshold, which can be a permissible tolerance value recognizable by the processor. For example, if the difference obtained by subtracting the re-inspection vector from the inspection vector equals zero, that is, when the inspection direction of one object is opposite to the re-inspection direction of another adjacent object, they are considered 'opposite', i.e., having the same magnitude and opposite direction. However, because the users of this method (e.g., children) can place the objects slightly askew, the aforementioned difference may not be exactly zero. The pre-configured inspection threshold (or tolerance value) can enhance the user experience of this method. For instance, if the aforementioned objects are placed sufficiently close to each other (as in the situations depicted in FIGS. 4(B) to 4(E)), they can be determined to be adjacent to each other. It is worth mentioning that the vectors can be directly defined on the object in multiple axial directions. That is to say, these vectors are defined as 'axes'.

In some embodiments, the content information of each object can contain its own inspection threshold, which can differ from others. For instance, a more loosen inspection threshold can be configured in a specific inspection direction of a special object, allowing other objects to be more easily 'equipped, installed, or placed.' The pairing relationship can be easier inspected or re-inspected by the processor. For example, a 'building base' might physically be a larger object or card. Additionally, offering a plurality of different inspection thresholds can produce different results for different relative position relationships. For example, when two objects are nearby or adhere to each other, the processor can determine one of the plurality of inspection thresholds is met; and when two objects are slightly further apart, the processor can determine other one of the plurality of inspection thresholds is met. In some embodiments, the inspection threshold can include mathematical computational result of the distance between any two of the plurality of objects (e.g., letter cards), mathematical computational result of vectors of any two of the plurality of objects, mathematical computational result of the content information of any two the plurality of objects, or a combination thereof.

Figure 12:
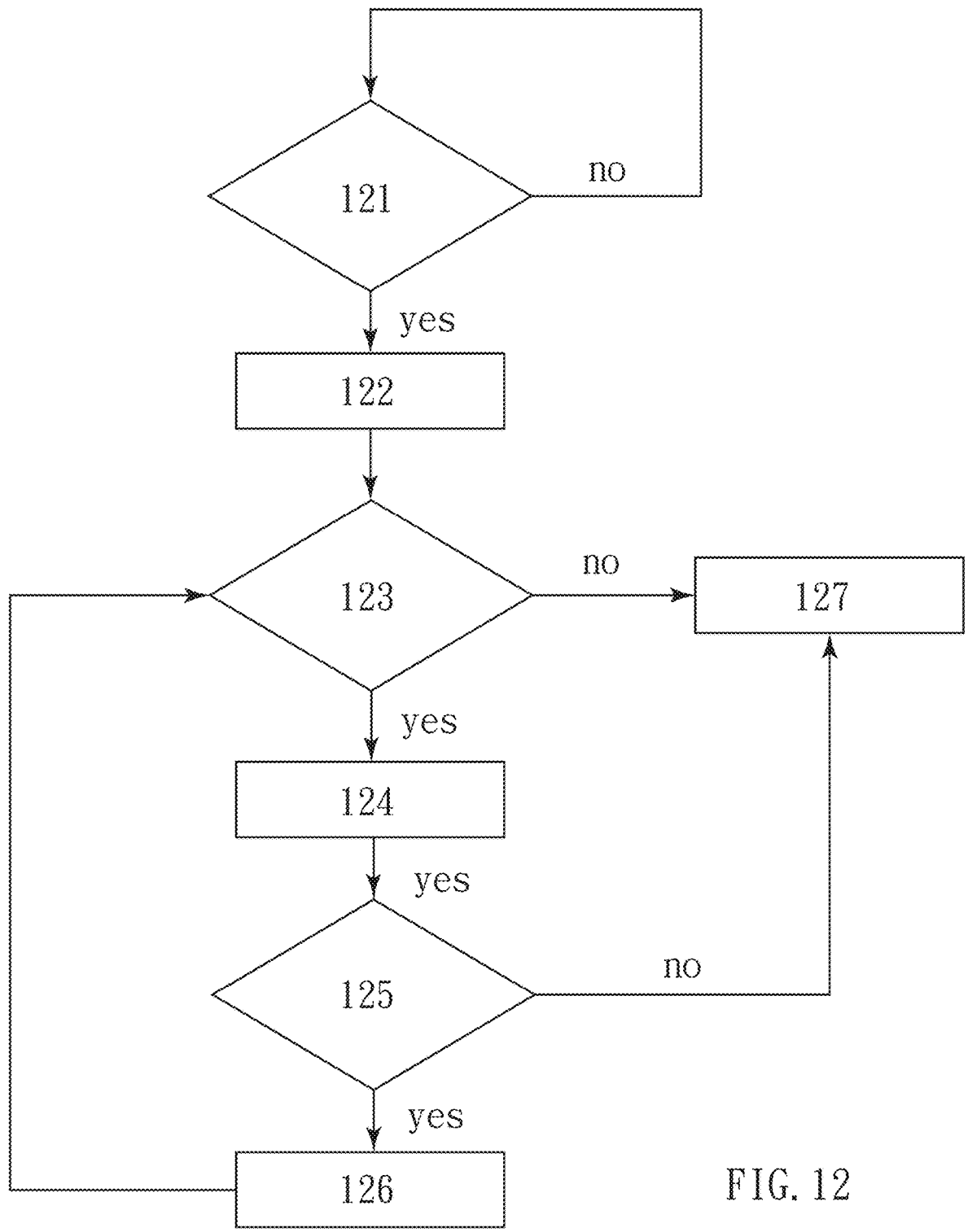
FIG. 12 is a schematic diagram of the method according to some embodiments of the present disclosure.

Other embodiments disclosed herein also provide method 120, which can be used to execute the details of step 105, such as an interactive method for augmented reality applications. FIG. 12 is a schematic diagram of the method according to some embodiments of the present disclosure. As shown in FIG. 12, at step 121, it is determined whether the arrangement of various objects conforms to a first rule. In some embodiments, the first rule can include determining whether in a first direction of an object, the object is adjacent to other object, while in the second direction of the object, the object is not adjacent to any other object. For instance, as shown in FIG. 3(D), the first direction at this time can be the right side of a letter card, and the second direction can be the left side of the letter card. At this time, the first direction of the 'A' letter card is adjacent to the 'R' letter card, and the second direction is not adjacent to any other letter card. Since the result of this determination is affirmative, method 120 proceeds to step 122, where the processor generates information set corresponding to the object, stores the content information of the object in the information set, and defines this object as a reference object. That is to say, under these circumstances, the 'A' letter card will be defined as a reference object.

In some embodiments, content information includes relative position information, such as including a plurality of directional information corresponding to the reference object of a plurality of objects. In some embodiments, the content information can include word character information, content identification information, verification information, virtual object information, encryption information, interaction instruction information, or a combination thereof. In some embodiments, the information set includes the content information of the object and can also include at least one word character information, a plurality of character information sequentially arranged, a combination of preconfigured character and equipment, or a combination thereof. It should be noted that the content information of a plurality of objects can be the same. For example, the content information of two objects could both be the character 'B.'

It should be noted that if, at step 121, the inspected object does not conform to the first rule, such as the 'C' letter card in FIG. 3(D) where the right side is not adjacent to other object, then step 121 will be re-executed for other objects until a reference object is found.

Next, at step 123, it is determined whether the arrangement of objects conforms to a second rule. In some embodiments, the second rule can include determining whether the first direction of the reference object is adjacent to any object other than the reference object itself. If the result of this determination is affirmative, then method 120 proceeds to step 124, where the processor is used to mark any object other than the reference object as a following object. For example, in the example of FIG. 3(D), once it is determined that the first direction of the 'A' letter card is adjacent to the 'R' letter card, the 'R' letter card is marked as a following object. Then, at step 125, it is determined whether the arrangement of objects conforms to a third rule. In some embodiments, the third rule can include using the processor to determine whether in the second direction of the following object is adjacent to the reference object. For example, determining if in the second direction of the 'R' letter card in FIG. 3(D) is adjacent to other letter cards. In FIG. 3(D), since the left side of the 'R' letter card is the 'A' letter card, the result of this determination would be affirmative. In some embodiments, if the execution result of step 121 is affirmative, for example, the 'A' letter card is adjacent to the 'R' letter card in the first direction, thus conforming to the first rule, then step 122 is executed, storing 'A' and 'R' in the information set without the need to re-execute "whether the first direction is adjacent to any object other than the reference object" in step 123, thus proceeding to step 124, marking the 'R' letter card as a following object.

If the determination in step 125 is affirmative, then method 120 proceeds to step 126, where the processor stores the content information of the following object in the information set, designates the following object as the reference object, and re-execute step 123. At this point, the reference object is the R letter card. Then, upon executing step 123, since the R letter card, now the reference object, is not adjacent to any other object in its first direction, the result of the determination in step 123 would be negative. If the determination is negative, i.e., in the first direction of the reference object is not adjacent to any object, then method 120 enters step 127, where the processor processes the information set and generates a computational result. Generating a computational result can include comparing with a content database using the processor. If the information set can be matched with content in the database, the computational result can be presented through a display device, such as displaying a 3D image of the A and R letter cards using an AR screen device (including smartphones, tablets, AR glasses, etc.). In some embodiments, the display device can also show prompt images, word images, success prompts, error prompts, failure prompts, character animation images, character skill images, or a combination thereof, based on the computational result.

Similarly, when the C, A, and R letter cards are completely arranged, as in the situations depicted in FIG. 3(E) to FIG. 3(I), method 120 can be executed using the same logic, and the final step 127 will display a 3D image of a vehicle. The aforementioned computational result can also correspond to enabling the display device to present images, audio, graphics, output results, or other similar signals.

Furthermore, if the determination in step 125 is negative, then method 120 can also proceed to step 127 to display an image corresponding to the computational result using the display device. In some embodiments, if any step in method 120 results in a negative computational result, then the processor can store the content information of the reference object and any other objects other than the reference object in an error record set. For example, if the word CARRY is misspelled as CERRY, the processor will record the content information of the C and E objects in the error record set for user review of the error. Since the aforementioned method 120 only determines one object at a time and ceases determination when the rule is not met, without needing to execute subsequent computations, it can save on computational resources.

Figure 13:
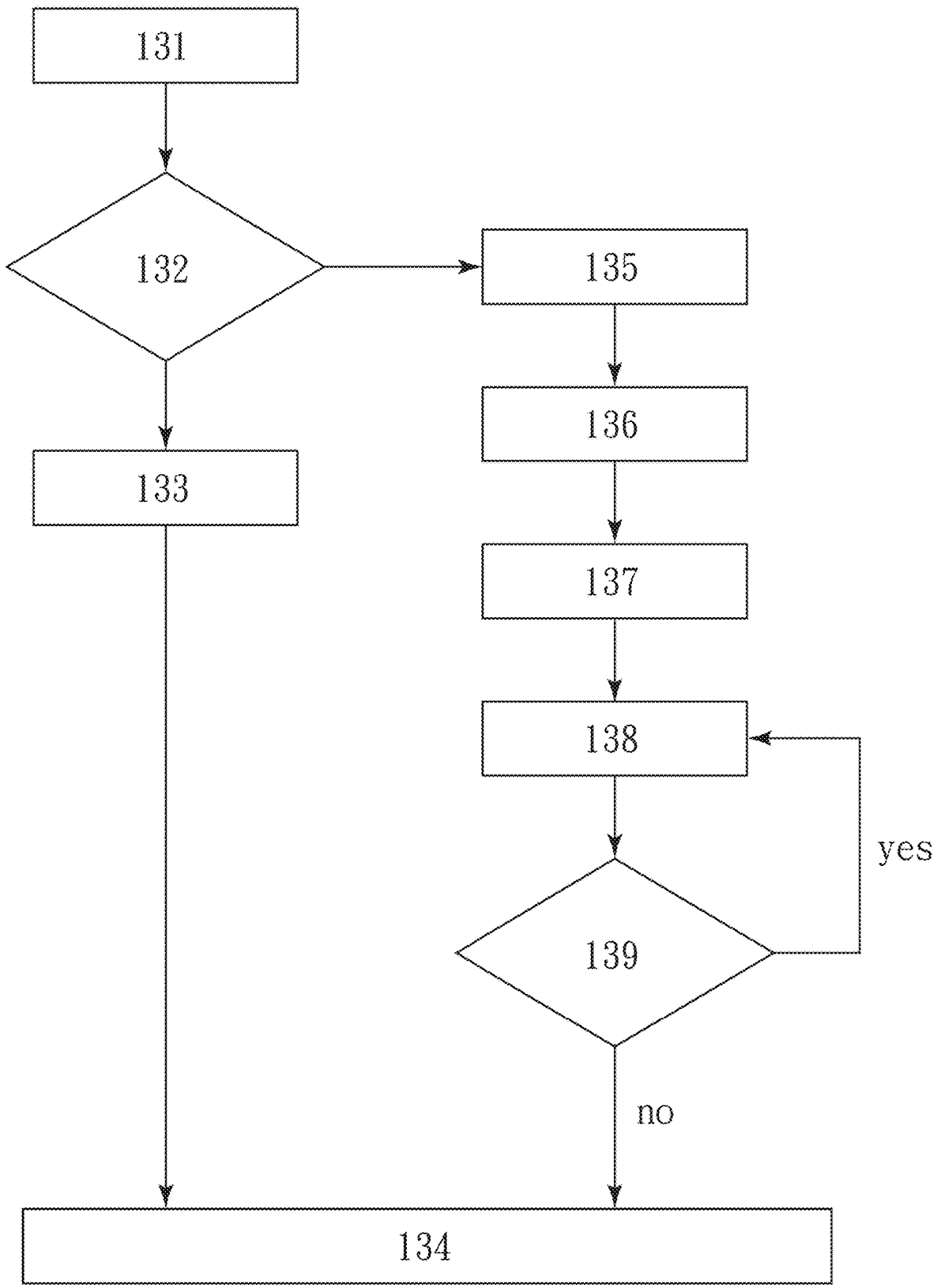
FIG. 13 is another schematic diagram of the method according to some embodiments of the present disclosure.

This disclosure also provides another method 130, which can also be used to execute the details of step 105, such as an interactive method for augmented reality. FIG. 13 is a schematic diagram of method 130 according to some embodiments of this disclosure. As shown in FIG. 13, in step 131, the information set of objects is provided to store content information, a plurality of operation direction information (such as a plurality of inspection directions), or results after at least one object has been processed by the processor. Then, in step 132, determine the number of objects. If the number of objects is odd, then the process proceeds to step 133, where the processor stores the content information of the object in the information set corresponding to this object, and in step 134, the processor returns the information set, thereby generating a computational result. For example, in FIG. 3A, if there is only one C letter card, then the computational result of step 134 would be to display a 3D image of the C letter card.

If the result of the determination in step 132 is a plurality of objects, then method 130 proceeds to step 135. At this step, to determine whether two of the objects are adjacent to each other, and in the inspection direction of one object is adjacent to other one object, and in the re-inspection direction of other one object is not adjacent to any other object. If so, the processor marks this object as the leading object. For example, in FIG. 3(D), the letter A card is marked as the leading object, or in FIG. 3(E), the letter C card is marked as the leading object. In some embodiments, the lead object could be an initial letter object, a character object, a building base object, or any other person, item, text, or event that can be added, appended, or attached.

Subsequently, at step 136, if the processor recognizes a plurality of objects in the image and the conditions are met: an object of the plurality of objects in the inspection direction of the object is adjacent to other one object of the plurality of objects, and; the inspection direction of the object and the re-inspection direction of the other one object are opposite. Then, the processor stores the content information of these two objects in the information set. In some embodiments, step 136 can also include the condition that the two objects are adjacent to each other. This confirms that two objects are adjacent and are arranged in the correct manner, as in the case of the letter A and R cards in FIG. 3(D).

Next, in step 137, the processor marks a reference object, such as the letter A card in FIG. 3(D) or the letter C card in FIG. 3(E). If the reference object is adjacent to other one object in the inspection direction, the processor marks the other one object as the following object. Then, if the inspection direction of the reference object and the re-inspection direction of the following object are opposite, the processor stores the content information of both the reference object and the following object in the information set.

Method 130 continues to proceed to step 138, where the processor marks the reference object as an inspected object; subsequently, the processor marks the following object as the reference object, and marks other one object, which is adjacent to the reference object in the inspection direction of the reference object, as other one of following object. For instance, in FIG. 3(E), the letter C card is initially the reference object, and the letter A card is the following object. After inspecting the C card, the A card can be marked as the reference object (a new reference), and the R card is marked as other one following object (a new following object). Then, in step 139, it is determined whether the inspection direction of the reference object (the new reference) and the re-inspection direction of the other one following object (the new following object) are opposite; and whether there are other following objects subsequently. If so, the processor stores the content information of the reference object (the new reference) and the other one following object (the new following object) in the information set. Otherwise, step 134 is executed, where the processor returns the information set to generate the computational result. Since the aforementioned method 130 assesses only one object at a time and terminates the assessment when it does not comply with the rules, without the need for subsequent operations, it can save the computational performance required.

Figure 14:
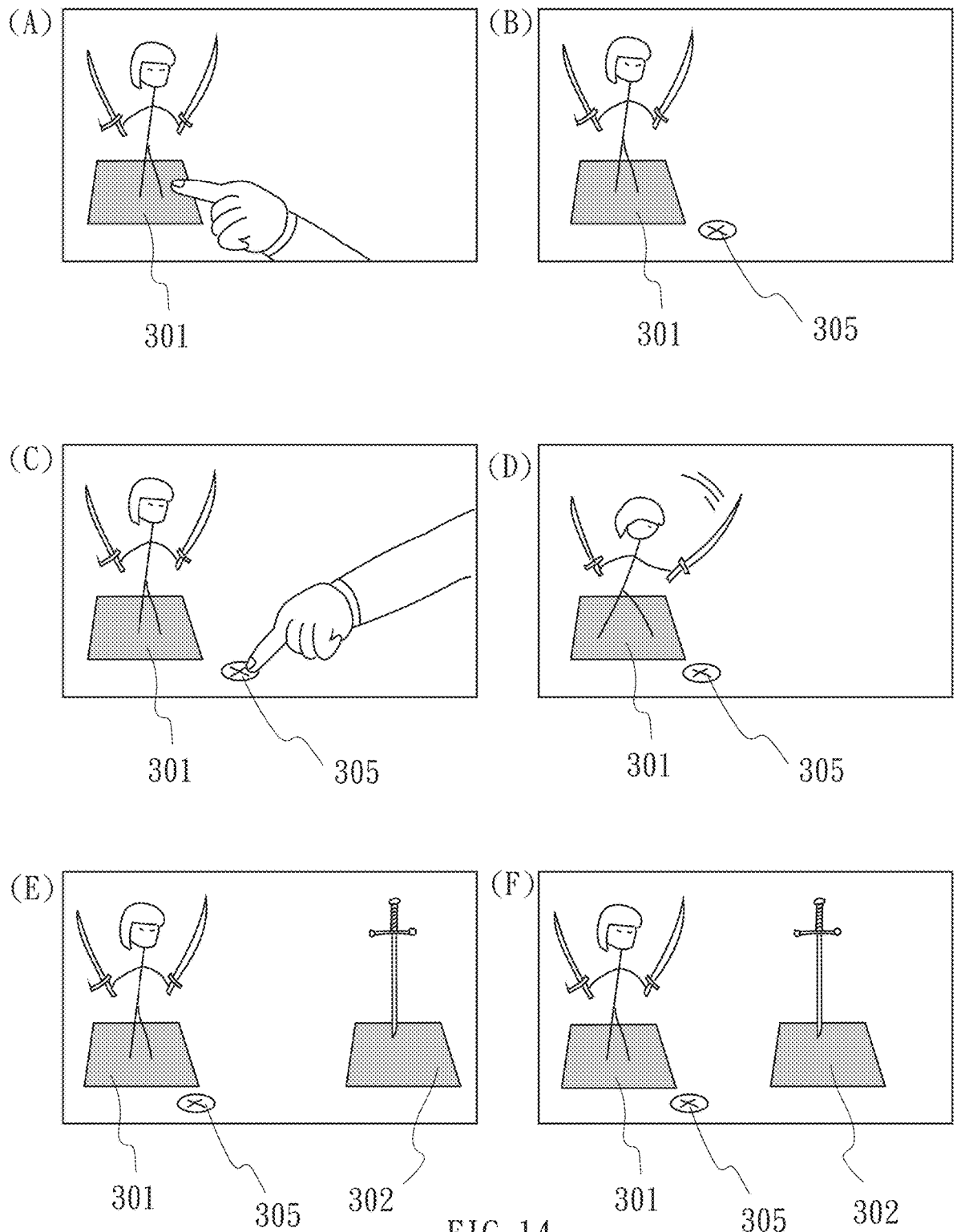
FIG. 14 is a schematic diagram of an example of applying this method in some embodiments of the present disclosure.

Although the foregoing embodiments have been described with the arrangement of letter cards as an example, the disclosure is not limited thereto. The disclosed methods can also be applied to board games, for instance. As an example, FIG. 14 is a schematic diagram of an example of applying this method in some embodiments of the present disclosure.

Firstly, in FIG. 14(A), a character card 301 can be placed, where a female warrior equipped with dual swords appears. Subsequently, in FIG. 14(B), by tapping on the position of character card 301, an attack button 305 is displayed. Then, as shown in FIG. 14(C), tapping the attack button 305 results in the character beginning an attack as depicted in FIG. 14(D). In some embodiments, it can be designed to that prohibiting the equipping of subsequent equipment cards 302 or energy cards 303, etc., unless the attack button 305 is displayed.

Figure 15:
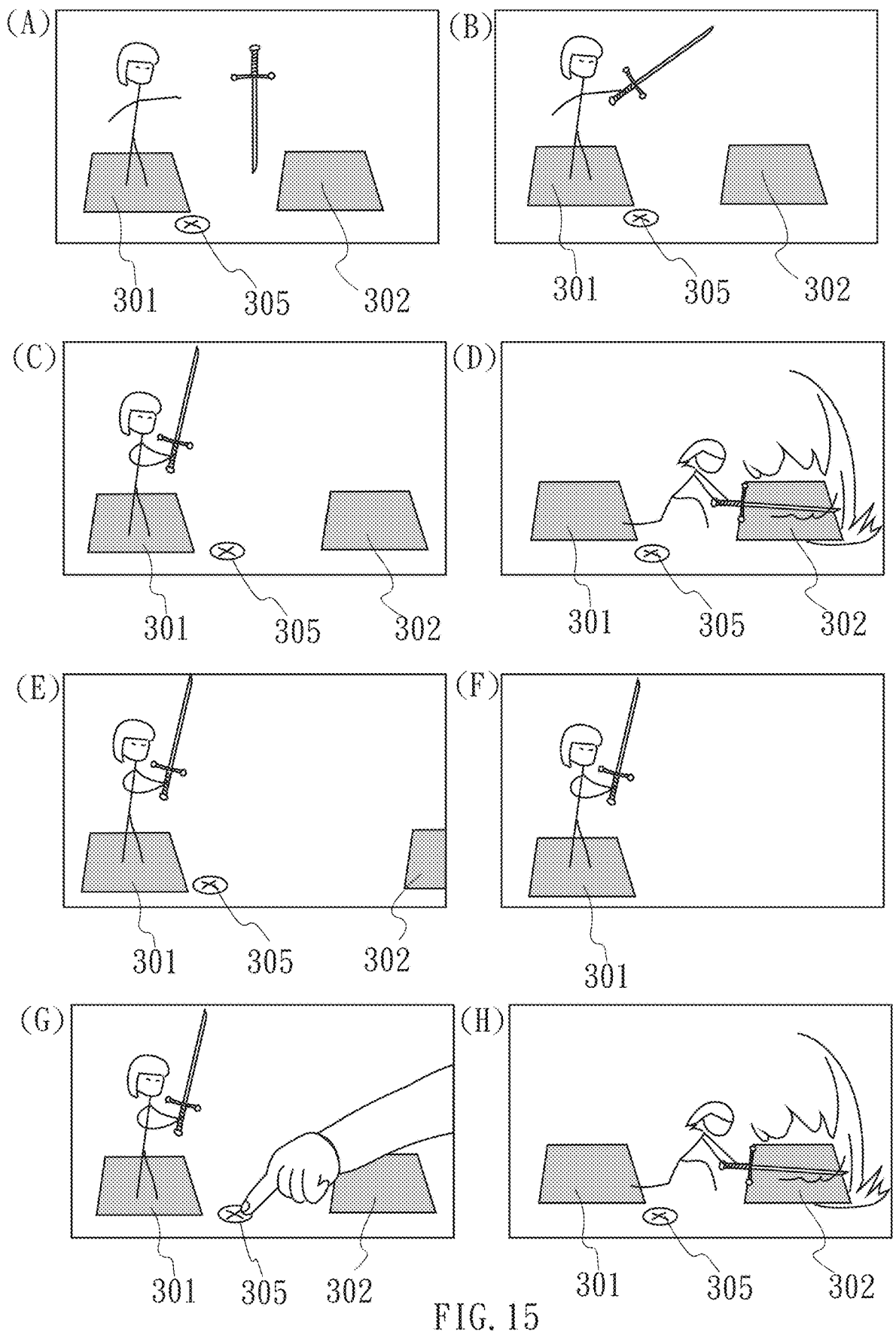
FIG. 15 is a schematic diagram of an example of applying this method in other embodiments of the present disclosure.

Next, in FIGS. 14(E) to 14(F), an additional saber weapon card 302 is brought near to character card 301 until the distance between character card 301 and weapon card 302 is less than a pre-configured inspection threshold or tolerance value. FIG. 15 illustrates examples of applying this method in other embodiments of the present disclosure. Then, in FIGS. 15(A) to 15(B), the 3D image of the weapon on top of the weapon card 302 moves to the top of the character card 301 to complete the assembly. In FIG. 15(B), when the 3D image of the saber on weapon card 302 is equipped to the 3D image on character card 301, the character then attacks using the saber instead of the previous dual swords. Next, in FIGS. 15(C) to 15(D), if character card 301 is combined with weapon card 302 for the first time, the system automatically demonstrates the attack animation shown in FIGS. 15(C) to 15(D) without the need to touch the attack button. In FIGS. 15(G) and 15(H), if the attack button 305 is tapped again, the character can attack again using the saber. In such a case, character card 301 can be, for example, the leading object referred to in the aforementioned method, and weapon card 302 can be the following object. Then, as shown in FIGS. 15(E) and 15(F), even if the weapon card 302 is removed, since the content information of each object can be updated in the aforementioned method, the weapon of the character card 301 at this time has been updated to the saber, hence it does not revert back to the dual swords upon removal of the saber weapon card 302.

FIG. 16 is another schematic diagram of an example of applying this method in further embodiments of the present disclosure. As shown in FIG. 16(A), an energy card 303 can be brought near to the character card 301. Then, as shown in FIGS. 16(B) to 16(D), the 3D image on the energy card 303 can move to the top of the character card 301, for example, moving along the direction 306 from the energy card 303 towards the character card 301. Subsequently, as depicted in FIG. 16(E), the mode of attack of the character can change accordingly. Although in the embodiments shown in FIG. 15, the mode of attack of character card 301 does not change after the removal of weapon card 302, meaning the content information is not updated again upon removal of weapon card 302, the present disclosure is not limited to this. For instance, as shown in FIGS. 16(F) and 16(G), when the energy card 303 is removed, the character's mode of attack returns to the previous attack mode. Thereby, greater design flexibility is provided to a designer. In some embodiments, the weapon card 302 and energy card 303 can be directly equipped onto the character card 301 without any specific order. In some embodiments, the character card 301 must first be equipped with the weapon card 302 before it can add or use the energy card 303, meaning that the objects can also have a specific assembly order.

In some embodiments, if the 3D image above weapon card 302 or energy card 303 has not yet moved on the top of the character card 301, the movement of the 3D image can be stopped until the weapon card 302 or energy card 303 is moved back into the sensing range. In some embodiments, commands can also be provided to restore the content information of each card back to the original content information, for instance, by controlling through gestures, thus reclaiming weapon card 302, energy card 303. In some embodiments, a plurality of weapon cards 302 and energy cards 303 can be equipped at the same time.

FIG. 17 is a schematic diagram of equipping a weapon card 302 or energy card 303 to a character card 301. When the weapon card 302 or energy card 303 at least partially enters the sensing range 304 of character card 301, determining that the distance between character card 301 and weapon card 302 (or energy card 303) is less than the aforementioned inspection threshold or tolerance value, thereby allowing the subsequent determination to continue.

Figure 18:
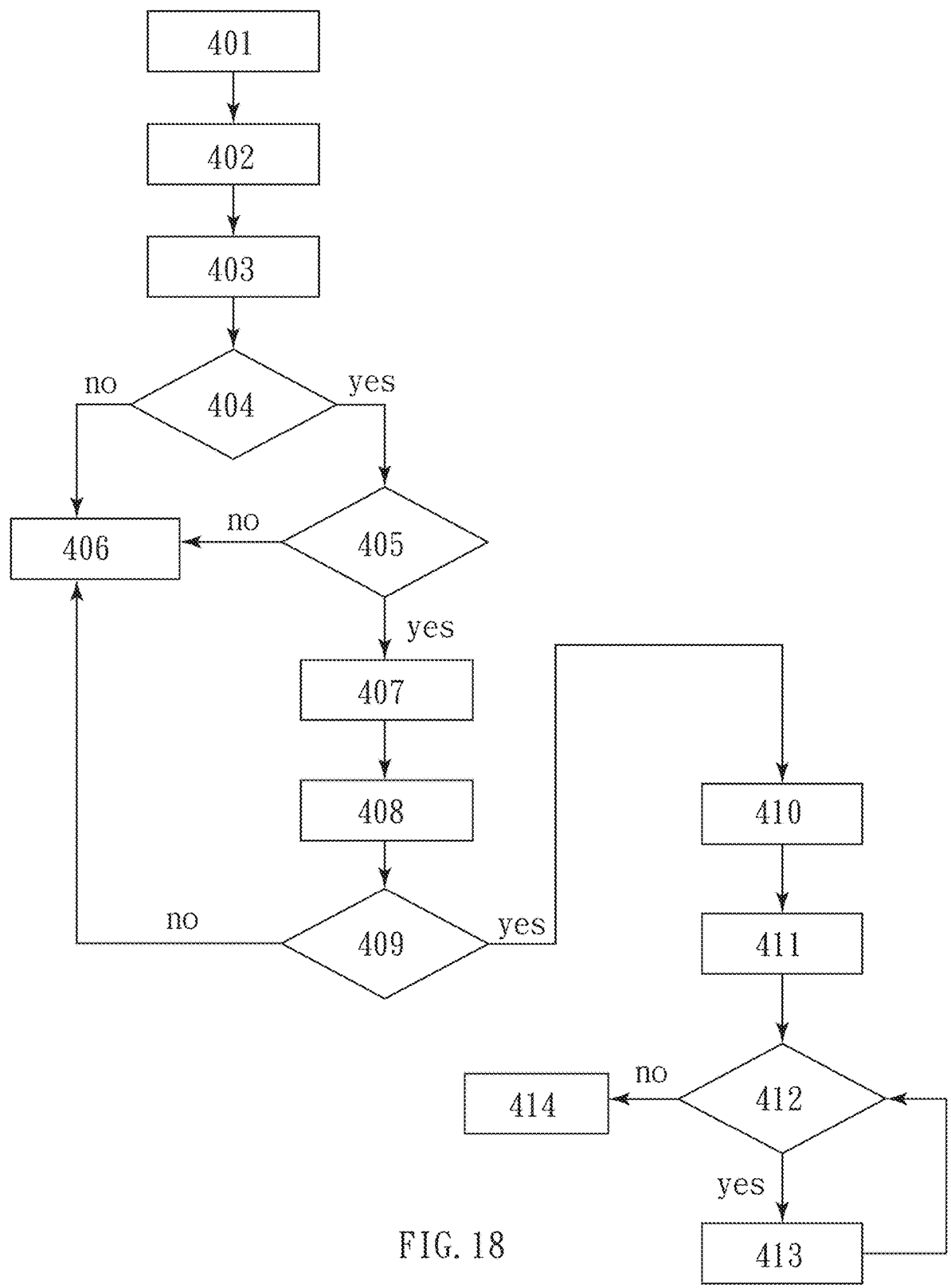
FIG. 18 is a flowchart of the method according to some embodiments of the present disclosure.

FIG. 18 is a flowchart of method 400 according to some embodiments of the present disclosure. Method 400, for example, can be used to determine the assembly relationship among character card 301, weapon card 302, and energy card 303 in the aforementioned embodiments. Initially, at step 401, an object (such as character card 301, weapon card 302, energy card 303) can be captured as a 2D image. The objects here can be cards, or can also be other objects with image information. In some embodiments, various imaging devices can be used for capturing, such as smartphones, cameras, AR glasses, MR glasses, tablets, laptops, and other devices equipped with ARKit or ARCore support for iOS/Android.

At step 402, the captured 2D image can be integrated with a pre-configured 3D scene. At step 403, during integration, an algorithm can be used to transform the captured 2D image into coordinate positions within the 3D scene, for example, by determining the 'axis' and 'distance' of the aforementioned coordinates, which can be referred to as information set.

At step 404, the processor can determine whether the user has activated an attack command. If the user has activated the attack command, then at step 405, determine whether the user has performed the attack command. If the user has not activated or performed the attack command, then step 404 or step 405 proceeds to step 406, where, even if the weapon card 302 is provided, the character card 301 and weapon card 302 do not combine.

If at step 405 it is determined that the user has performed the attack command, then at step 407, the data for character card 301 is updated, for example, to initiate an attack by the character. Next, at step 408, the weapon card 302 is added. At step 409, determine whether the distance between weapon card 302 and character card 301 has entered the sensing range 304. If so, the process proceeds to step 410 to update the data for character card 301, for example, to equip the character with a new weapon. If it is determined at step 409 that the distance has not entered the sensing range, then the process returns to step 406, and no assembly occurs between character card 301 and weapon card 302.

Then, at step 411, the energy card 303 is added. Next, at step 412, determine whether the distance between character card 301 and energy card 303 has entered the aforementioned sensing range 304. If so, the data for character card 301 is updated, for example, to modify the attack method of character card 301, and step 412 can be repeated until the distance between character card 301 and energy card 303 leaves the aforementioned sensing range 304, at which point method 400 proceeds to step 414, meaning no assembly occurs between character card 301 and energy card 303.

In summary, the embodiments disclosed herein provide various methods for recognizing object assemblies in augmented reality (AR) images, which can utilize a camera and a processor to recognize objects within the images. This can save performance resources during processing and address the issue of unstable detection when detecting assembly of two or more card patterns simultaneously, and can also provide functions such as entertainment, education, and more. Furthermore, the interactive methods provided by these disclosed embodiments allow for greater flexibility in the assembly of objects.

While the embodiments and their advantages have been disclosed above, it should be understood that those skilled in the art, without departing from the spirit and scope of this disclosure, can make modifications, substitutions, and refinements. Moreover, the scope of protection of this disclosure is not limited to the specific embodiments described in the specification. Those skilled in the art can understand from the content disclosed herein current or future processes, machines, manufactures, compositions of matter, devices, methods, and steps developed, as long as they can be implemented with substantially the same functionality or to obtain substantially the same result as described in the herein embodiments, they can be used in accordance with this disclosure. Therefore, the scope of protection of this disclosure encompasses the aforementioned processes, machines, manufactures, compositions of matter, devices, methods, and steps. Additionally, each claim constitutes a separate embodiment, and the scope of protection of this disclosure also includes combinations of the various claims and embodiments.

The invention claimed is:

1. A method for augmented reality interaction, using a camera and a processor to recognize at least one object in an image,
    wherein the at least one object includes a content information and a plurality of operation direction information;
    the plurality of operation direction information includes an inspection direction, a re-inspection direction, or a combination thereof;
    the method comprises a first re-inspection step, which includes using the processor to inspect whether the inspection direction of an object of the at least one object and the re-inspection direction of any one object of the at least one object, which the object is adjacent to, conform to a pairing relationship; and
    if in conformity with the pairing relationship, the processor processes the content information of the object and the content information of the any one object to generate an image rendering;
    if the object of the at least one object, in the inspection direction of the object, is adjacent to any one object of the at least one object, and if the object of the at least one object, in the re-inspection direction of the object, is not adjacent to any other object of the at least one object, then the processor processes the object of the at least one object as a leading object,
    wherein if the pairing relationship is conformed, the processor updates the content information of the object of the at least one object.

2. The method of claim 1, further comprising a first inspection step, the first inspection step includes:
    using the processor to inspect whether an object of the at least one object, in the inspection direction of the object, is adjacent to any one object of the at least one object, to generate a first inspection result;
    if the first inspection result is affirmative, then the processor inspects whether the object of the at least one object, in the re-inspection direction of the object, is adjacent to any other one object of the at least one object, to generate a second inspection result.

3. The method of claim 2, wherein if the first inspection result of the first inspection step is negative, then the processor repeats the first inspection step for other one object of the at least one object.

4. The method of claim 1, further comprising:
    using the processor to inspect whether a re-inspection direction of a following object and the inspection direction of the at least one object conforms to the pairing relationship, and generating a pairing result, wherein the following object, in the re-inspection direction of the following object, is adjacent to the at least one object; and
    using the processor to process the pairing result to generate an image rendering.

5. The method of claim 2, wherein the method further comprises
    using the processor to execute the first re-inspection step starting with the leading object;
    the first re-inspection step further comprises:
    generating a pairing result after inspecting for conformity with the pairing relationship by the processor;
    processing the pairing result to generate the computational result image rendering by the processor.

6. The method of claim 5, wherein if the processor determines that the first inspection result for an object of the at least one object is affirmative and the second inspection result is negative, then the processor processes the object of the at least one object as the leading object.

7. The method of claim 4, wherein the first re-inspection step further comprises:
using the processor to execute the first re-inspection step for the at least one object in accordance with a placement order;
if the pairing result does not conform to the pairing relationship, then the processor stops executing the first re-inspection step.

8. The method of claim 5, wherein the first re-inspection step further comprises:
using the processor to execute the first re-inspection step for the at least one object in accordance with a placement order;
if the pairing result does not conform to the pairing relationship, then the processor stops executing the first re-inspection step;
wherein the placement order is selected from the order in which the at least one object is arranged according to the inspection direction of the at least one object, the order in which the at least one object is arranged according to the inspection direction of the leading object, or a combination thereof.

9. The method of claim 5, wherein there are a plurality of the leading objects.

10. The method of claim 5, wherein the leading object includes the content information pre-configured as character objects, building base objects, or a combination thereof, or other entities, items, text, or events that can be added, appended, or attached, that the processor can recognize.

11. The method of claim 1, wherein
the number of the at least one object is plural;
the inspection direction includes a pre-configured inspection vector;
the re-inspection direction includes a pre-configured re-inspection vector;
the pairing relationship includes a pre-configured pairing relationship.

12. The method of claim 11, wherein
the plurality of objects including a first object and a second object;
the first object including a first object inspection threshold;
the second object including a second object inspection threshold;
the first object inspection threshold and the second object inspection threshold are different; and
the pairing relationship includes a first pairing inspection threshold and a second pairing inspection threshold; and
the method further comprises:
confirming whether a mathematical result of the distance between the first object and the second object, the mathematical computational result of the vector between the first object and the second object, the image rendering of the content information of the first object and the second object, or their combination conforms to the first pairing inspection threshold or the second pairing inspection threshold; and
displaying the image rendering according to the first pairing inspection threshold or the second pairing inspection threshold.

13. The method of claim 1, further comprising:
using the processor to store the pairing relationship in at least one information set; and
using the processor to compute the at least one information set to generate the image rendering.

14. The method of claim 1, the re-inspection step further comprises:
when the inspection direction of the object of the at least one object and the re-inspection direction of the any one object of the at least one object conforms to the pairing relationship, the processor configures the object of the at least one object as a reference object and configures the any one object of the at least one object as a following object;
when the inspection direction of the reference object and the re-inspection direction of the following object conform to the pairing relationship, then the processor processes the content information of the reference object and the content information of the following object to generate another image rendering; and
the processor configures the reference object as an inspected object, and sets the following object as other one of the reference object;
after the first re-inspection step, the processor executes a second inspection step, which includes configuring the at least one object as other one of the following object when the other one of the reference object, in the inspection direction of the other one the reference object, is adjacent to the at least one object;
where the processor repeats the execution of the first re-inspection step and the second inspection step until the result of the second inspection step is negative.

15. The method of claim 1, wherein if a user removes the any one object of the at least one object from the image recognized, the processor reads the content information of the object of the at least one object and presents it on a display device.

16. The method of claim 1, further comprising:
an image presentation step, wherein the processor recognizes the content information of the at least one object in the image, and presents the content information via a display device;
the content information includes null values, or includes model information, three-dimensional model information, character model information, sound information, digital media information, word character information, content identification information, verification information, virtual object information, encryption information, interactive command information, or a combination thereof.

17. The method of claim 1, wherein
the content information includes an interactive object for a user to interact with the at least one object;
the interactive object is printed on the surface of the at least one object;
the user interacts with the at least one object using a gesture; and
the processor updates the content information of the at least one object.

18. The method of claim 1, wherein
the plurality of operation direction information includes an inspection area;
the method further includes executing the first re-inspection step when the inspection area of the object of the at least one object includes the any one object of the at least one object within it.

19. The method of claim 18, wherein the inspection area comprises a virtual plane, a virtual three-dimensional space, or a combination thereof recognized in the image by the processor, and the plurality of operation direction information includes the X-axis, Y-axis, Z-axis, or a combination thereof of the at least one object within a virtual plane, a virtual three-dimensional space, or a combination thereof.

20. The method of claim 2, wherein the first re-inspection step is executed with a tolerance value;
when the at least one object is plural, the term "adjacent" refers to the condition where the distance between the inspection direction of the object of the at least one object and the re-inspection direction of the any one object of the at least one object on a virtual plane or within a virtual three-dimensional space is within the tolerance value.

21. The method of claim 20, wherein the tolerance value includes a distance tolerance and an angle tolerance, with the distance between the object of the at least one object and the any one object of the at least one object falling within the distance tolerance;
the distance tolerance is between 0 to 5 centimeters, 5 to 10 centimeters, or 10 to 15 centimeters; the angle tolerance is between 0 degrees to 15 degrees, or between 80 degrees to 110 degrees.

22. A method for augmented reality interaction using a camera and a processor to recognize a plurality of objects in an image;
wherein any one object of the plurality of objects includes a content information and a plurality of direction information, the plurality of direction information including a first direction and a second direction;
the method comprising a step A, a step B, a step C, and a step D, wherein
the step A including
when an object of the plurality of objects, in the first direction of the object, is adjacent to other one object of the plurality of objects, and the object of the plurality of objects, in the second direction of the object, is not adjacent to the plurality of objects, using the processor to generate an information set corresponding to the object of the plurality of objects, and stores the content information of the object of the plurality of objects in the information set; and
determining the object of the plurality of objects as a reference object;
the step B including
if the reference object, in the first direction of the reference object, is adjacent to any one object of the plurality of objects other than the reference object, using the processor to mark the any one object of the plurality of objects as a following object and executing the step C; and
if the reference object, in the first direction of the reference object, is not adjacent to the plurality of objects, executing Step D; and
the step C including
using the processor to determine if the following object, in the second direction of the following object, is adjacent to the reference object, using the processor to store the content information of the following object into the information set;
determining the following object as the reference object; and
executing the step B;
the step D including
using the processor processes the information set to generate a image rendering,
wherein the content information further includes a relative position information, the relative position information includes the plurality of directional information of the plurality of objects corresponding to the reference object.

23. The method of claim 22, wherein the step C further comprises if the following object, in the second direction of the following object, is not adjacent to the reference object, executing the step D.

24. The method of claim 22, further comprising using a display device, based on the image rendering, displaying images such as prompt images, text images, success prompt images, error prompt images, failure prompt images, character animation images, character skill images, or a combination thereof;
wherein the step C further comprises using the processor to determine if the following object, in the second direction of the following object, is not adjacent to the reference object, then using the display device to display an image corresponding to the image rendering.

25. The method of claim 24, wherein in the step B, if the reference object, in the first direction of the reference object, is not adjacent to the any one object of the plurality of objects other than the reference object, using the processor generates a prompt result, and displays it on a display device.

26. The method of claim 25, wherein the processor stores the content information of the reference object and the content information of the any one object of the plurality of objects other than the reference object in an error record set.

27. The method of claim 24, wherein the information set includes the content information of at least one object of the plurality of objects, and includes at least one word character information, a plurality of sequential word character information, predetermined assembly information of character and equipment, or a combination thereof;
the object of the plurality of objects is a leading object, a prefix object, a base object, or a character object;
if the edge of any one object of the plurality of objects is less than 5 centimeters from the shortest distance to other one object of the plurality of objects, then any two objects of the plurality of objects are defined as adjacent to each other.

28. A method for augmented reality interaction, using a camera and a processor to recognize at least one object in an image;
the object includes content information and a plurality of operational direction information;
the plurality of operation direction information includes an inspection direction, a re-inspection direction, or a combination thereof;
the interactive method includes a steps M, a step Q, and a step R;
the step M includes:
providing an information set to store the content information, the plurality of operation direction information, or the result of the processing and computation executed by the processor on the at least one object;
the step Q includes:
if the processor recognizes a plurality of objects in the image and the following conditions are met:
one of two objects of the plurality of objects is adjacent to other one of the two objects in the inspection direction, and
the inspection direction of the one of the two objects is opposite to the re-inspection direction of the other one of the two objects,
then using the processor to store the content information of the two objects into the information set;

the step R includes:

using the processor to return the information set and generate a image rendering, wherein the inspection direction includes the reading direction of English words, the reading direction of Chinese words, the placement orientation of equipment slots of character objects, or a combination thereof;

the plurality of operation direction information further includes a plurality of inspection directions.

29. The method of claim 28, wherein prior to the step Q, includes a step X, comprising if the two objects of the plurality of objects are adjacent to each other, if the inspection direction of one of the two objects is adjacent to other one of the two objects, and if the one of the two objects, in the re-inspection direction of the one, is not adjacent to other objects of the plurality of objects, then using the processor to mark the one of the two of the plurality of objects as a leading object.

30. The method of claim 28, wherein the number of the at least one object is at least two objects, and after the step Q, includes a step Y, comprising:

using the processor to mark the one of the two objects of the plurality of objects as a reference object;

if the reference object, in the inspection direction of the reference object, is adjacent to other objects of the plurality of objects, using the processor to mark the other objects of the plurality of objects as at least one following object;

if the inspection direction of the reference object is opposite to the re-inspection direction of the at least one following object, using the processor to store the content information of the reference object and the content information of the at least one following object into the information set.

31. The method of claim 30, wherein after step Y further includes at least one step Z, comprising:

using the processor to mark the reference object as an inspected object, and mark the following object as the reference object;

using the processor to mark other one objects of the plurality of objects, that is adjacent to the reference object in the inspection direction of the reference object, as other one of the at least one following object;

if the inspection direction of the reference object is opposite to the re-inspection direction of the other one of the at least one following object, then using the processor to store the content information of the reference object and the content information of the other one of the at least one following object into the information set, and executing the step Z again.

* * * * *